(12) United States Patent
Grosjean et al.

(10) Patent No.: US 6,870,992 B2
(45) Date of Patent: Mar. 22, 2005

(54) ALIGNMENT APPARATUS AND METHODS FOR TRANSVERSE OPTICAL COUPLING

(75) Inventors: Charles I. Grosjean, Pasadena, CA (US); Guido Hunziker, Altadena, CA (US); Paul M. Bridger, Altadena, CA (US); Oskar J. Painter, Pasadena, CA (US)

(73) Assignee: Xponent Photonics Inc, Monrovia, CA (US)

( * ) Notice: Subject to any disclaimer, the term of this patent is extended or adjusted under 35 U.S.C. 154(b) by 187 days.

(21) Appl. No.: 10/302,751

(22) Filed: Nov. 22, 2002

(65) Prior Publication Data

US 2003/0235369 A1 Dec. 25, 2003

Related U.S. Application Data

(60) Provisional application No. 60/333,236, filed on Nov. 23, 2001.

(51) Int. Cl.[7] .............................. G02B 6/42; H01L 21/00
(52) U.S. Cl. .............................. 385/52; 385/42; 385/43; 385/48; 385/50; 385/51; 385/129; 385/130; 438/29; 438/31
(58) Field of Search ............................... 385/52, 48–51, 385/43, 14, 129–132; 438/29, 31

(56) References Cited

U.S. PATENT DOCUMENTS

| | | | |
|---|---|---|---|
| 3,912,363 A | 10/1975 | Hammer | 385/14 X |
| 4,097,117 A | 6/1978 | Neil et al. | 385/49 X |
| 4,097,118 A | 6/1978 | Hammer | 385/49 X |
| 4,142,775 A | 3/1979 | Ramaswamy et al. | 385/14 X |
| 5,039,192 A | 8/1991 | Basu | 385/31 |
| 5,138,676 A | 8/1992 | Stowe et al. | 385/32 |
| 5,446,579 A | 8/1995 | Lomashevitch | 359/333 |
| 5,475,704 A | 12/1995 | Lomashevich | 372/92 |
| 5,502,783 A | 3/1996 | Wu | 385/42 |

(List continued on next page.)

OTHER PUBLICATIONS

F. Agahi. B. Pezeshki, J. A. Kash, and D. W. Kisker, "Asymmetric Fabry–Perot modulator with a waveguide geometry", Electron. Lett. vol. 32(3) 210 (1996).

Cafl Aflt. Diego R. Yankefovich. Andre Knoesen, Eril Mao, and Jams, S. Herds Jr., "In–line flber evanescent field uI.ctrooptlc modulators", Journal of Nonlinear Optical Physics and Materials vol. 9 (1) 79 (2000).

C. I. H. Ashby, M. M. Bridges, A. A. Allerman; B. E. Hammons, "Origin of the time dependence of wet oxidation of AIGaAs", Appl. Phys. Lett. Vol. 75(1) 73 (1999).

(List continued on next page.)

*Primary Examiner*—Brian M. Healy
(74) *Attorney, Agent, or Firm*—David S. Alavi; Scott R. Miller; Christie Parker & Hale LLP

(57) ABSTRACT

Optical components may be aligned for transverse-optical coupling by: fabricating a first optical component on a substrate; fabricating an alignment member on the substrate suitably positioned relative to the first optical component; and assembling a second optical component onto the alignment member, thereby establishing transverse optical coupling between the optical components. The substrate may preferably be substantially planar. The alignment member may mechanically engage the second optical component so as to accurately establish and stably maintain transverse optical coupling. The first optical component and the alignment member may preferably be fabricated on the substrate using precision spatially selective materials processing techniques. Transverse optical coupling between two optical components may be stably maintained by substantially embedding transverse-coupled portions of the components in a substantially solid substantially transparent low-index medium. An alignment member may serve to accurately position the transverse-coupled components prior to embedding and hold them in place during embedding.

54 Claims, 9 Drawing Sheets

U.S. PATENT DOCUMENTS

| | | | | |
|---|---|---|---|---|
| 5,515,461 | A | | 5/1996 | Deri et al. ............... 385/30 |
| 5,703,989 | A | | 12/1997 | Khan et al. ............... 385/130 |
| 5,926,496 | A | | 7/1999 | Ho et al. ............... 372/92 |
| 6,009,115 | A | | 12/1999 | Ho ............... 372/92 |
| 6,031,945 | A | | 2/2000 | You et al. ............... 385/14 |
| 6,052,495 | A | | 4/2000 | Little et al. ............... 385/2 |
| 6,222,964 | B1 | | 4/2001 | Sadot et al. ............... 385/40 |
| 6,282,219 | B1 | | 8/2001 | Butler et al. ............... 372/50 |
| 6,310,995 | B1 | | 10/2001 | Saini et al. ............... 385/28 |
| 6,330,378 | B1 | | 12/2001 | Forrest et al. ............... 385/14 |
| 6,339,607 | B1 | | 1/2002 | Jiang et al. ............... 372/50 |
| 6,356,694 | B1 | | 3/2002 | Weber ............... 385/132 |
| 6,400,856 | B1 | | 6/2002 | Chin ............... 385/11 |
| 6,424,669 | B1 | | 7/2002 | Jiang et al. ............... 372/30 |
| 6,445,724 | B2 | | 9/2002 | Abeles ............... 372/50 |
| 6,496,636 | B1 | * | 12/2002 | Braiman et al. ............... 385/129 |
| 6,507,684 | B2 | | 1/2003 | Tapalian et al. ............... 385/30 |
| 6,560,259 | B1 | | 5/2003 | Hwang ............... 372/45 |
| 6,744,953 | B2 | * | 6/2004 | Lemoff et al. ............... 385/52 |
| 2002/0081055 | A1 | | 6/2002 | Painter et al. ............... 385/2 |
| 2002/0122615 | A1 | | 9/2002 | Painter et al. ............... 385/15 |
| 2002/0172459 | A1 | * | 11/2002 | Bailey et al. ............... 385/31 |
| 2003/0081902 | A1 | | 5/2003 | Blauvelt et al. ............... 385/50 |
| 2003/0081903 | A1 | * | 5/2003 | Vahala et al. ............... 385/50 |
| 2004/0165812 | A1 | * | 8/2004 | Blauvelt et al. ............... 385/14 |

OTHER PUBLICATIONS

W. G. Bi and C. W. Tu, "Bowing parameter of the band–gap energy of $GaN_xAs_{1-x}$", Appl. Phys. Lett vol. 70(12) 1608 (1997).

P. Chavarkar. L. Zhao, S. Keller, A. Fisher, C. Zheng, J. S. Speck, and U. K. Mishra, "Strain relaxation of $lnxGa_{1-x}As$ during lateral oxidation of underlying AlAs layers", Appl. Phys. Lett. vol. 75(15) 2253 (1999).

E. I. Chen, N. Holonyak, Jr., andM. J. Ries, "Planar disorder– and native–oxide–defined photopumped AlAs–GaAs superlattice minidisk lasers", J. Appl. Phys. vol. 79(11) 8204 (1996).

K. D. Choqutte, K. M. Geib, C. I. H. Ashby, R. D. Twesten, O. Blum, H. Q. Hou, D. M. Follstaedt, B. E. Hammons, D. Mathes, and R Hull, "Advances in selective wet oxidation of AlGaAs alloys", IEEE Journal of Selected Topics in Quantum Electronics vol. 3(3) 916 (1997).

R. H. Horng, D. S. Wuu, S.C. Wei, M. F. Huang, K.H. Chang, P.H. Liu, and K. C. Lin, "AlGaInP/AuBe/glass light emitting diodes fabricated by wafer–bonding technology", Appl. Phys. Letts. vol. 75(2) 154 (1999).

D.L. Huffaker, H. Deng, Q. Deng, and D.G. Deppe, "Ring and stripe oxide–confined vertical–cavity surface–emitting lasers", Appl. Phys. Lett., vol. 69(23), 3477 (1996).

B. Koley, F. G. Johnson, O. King, S. S. Saini, and M. Dagenais, "A method of highly efficient hydrolization oxidation of Ill–V semiconductor lattice matched to indium phosphide", Appl. Phys. Lett. vol.75(9)1264 (1999).

M. Kondow, T. Kitatani, S. Nakatsuka, M. C. Larson, K. Nakahara, Y. Yazawa, M. Okai, and K. Uomi, "GaInNAs: A novel material for long–wavelength semiconductor lasers", IEEE Journal of Selected Topics in Quantum Electronics, vol. 3(3), 719 (1997).

B.A. Little, S.T. Chu, H. A. Haus, J. Foresi, and J.–P. Laine, "Microring channel dropping filters", J. Lightwave Technology vol. 15 998 (1997).

Y. Luo, D. C. Hall, L. Kou, L. Steingart, J. H. Jackson, O. Blum, and H. Hou, "Oxidized $Al_xGa_{1-x}As$ heterostructures planar waveguides", Appl. Phys. Lett. vol. 75(20) 3078 (1999).

M. H. MacDougalP. D. Dapkus, A. E. Bond, C.–K. Lin, and J. Geske, "Design and fabrication of VCSEL's with $Al_xO_y$–GaAs DBR's", IEEE Journal of Selected Topics in Quantum Electronics vol. 3(3) 905 (1997).

M. H. MacDougal, P. D. Dapkus, "Wavelength shift of selectively oxidized $Al_xO_y$–AlGaAs–GaAs distributed Bragg reflectors", IEEE Photonics Tech. Lett. vol. 9(7) 884 (1997).

R. L. Naone and L. A. Coldren, "Surface energy model for the thickness dependence of the lateral oxidation of AlAs", J. Appl. Phys. vol. 82(5) 2277 (1997).

N. Ohnoki, F. Koyama, and K. Iga, "Superlattice AlAs/AlInAs–oxide current aperture for long wavelength InP–based vertical–cavity surface–emitting laser structure", Appl. Phys. Lett. vol. 73(22) 3262 (1998).

N. Ohnoki, F. Koyama, and K. Iga, "Super–lattice AlAs/AlInAs for lateral–oxide current confinement in lnP–based lasers", J. Crystal Growth vol. 195 603 (1998).

R. D. Pechstedt, P. St. J. Russell, T. A. Birks, and F. D. Lloyd–Lucas, "Selective coupling of fiber modes with use of surface–guided Bloch modes supported by dielctric multilayer stacks", J. Opt. Soc. Am. A vol. 12(12) 2655 (1995).

R. D. Pechstedt, P. St. J. Russell, "Narrow–band in–line fiber filter using surface–guided Bloch modes supported by dielectric multilayer stacks", J. Lightwave Tech. vol. 14(6) 1541 (1996).

B. Pezeshki, J. A. Kash, D. W. Kisker, and F. Tong, "Multiple wavelength light source using an asymmetric waveguide coupler", Appl. Phys. Lett. vol. 65(2) 138 (1994).

B. Pezeshki, J. A. Kash, D. W. Walker, and F. Tong, "Wavelength sensitive tapered coupler with anti–resonant waveguide", IEEE Phot. Tech. Lett. vol.6(10) 1225 (1994).

B. Pezeshki, F. F. Tong, J. A. Kash, and D. W. Kisker, "Vertical cavity devices as wavelength selective waveguides", J. Lightwave Tech. Vol. 12(10) 1791 (1994).

B. Pezeshki, J. A. Kash, and F. Agahi, "Waveguide version of an asymmetric Fabry–Perot modulator", Appl. Phys. Lett. vol. 67(12) 1662 (1995).

H. Salto, T. Makimoto, and N. Kobayashi, "MOVPE growth of strained InGaAsN/GaAs quantum wells", J. Crystal Growth, vol. 195 416 (1998).

I.–H. Tan, C. Reaves, A. L. Holmes Jr., E. L. Hu, J. E. Bowers, and S. DenBaars, "Low–temperature bonding of Ill–V semiconductors", Electronics Letters 31 588 (1995).

H. Wada and T. Kamijoh, "Effects of heat treatment on bonding properties in lnP–to–Si direct wafer bonding", Japanese Journal of Applied Physics Part 1 33 4878 (1994).

H. Wada, T. Kamijoh, and Y. Ogawa, "Direct bonding of lnP to different materials for optical devices", Proceedings of the 3rd International Symposium on Semiconductor Wafer Bonding Science, Technology, and Applications, 95–97 579, The Electrochemical Society (Pennington NJ, 1995).

H. Wada and T. Kamijoh, "Room–temperature cw operation of InGaAsP lasers on Si fabricated by wafer bonding", IEEE Photonics Technology Letters 8 173 (1996).

H. Wada and T. Kamijoh, "Wafer bonding of lnP to Si and its application to optical devices", Japanese Journal of Applied Physics Part 1 37 1383 (1998).

Z. J. Wang, S.-J. Chua, F. Zhou, W. Wang, and R. H. Wu, "Buried heterostructures InGaAsP/InP strain-compensated multiple quantum well laser with a native-oxidized InAlAs current blocking layer", Appl. Phys. Lett. vol. 73(26) 3803 (1998).

H. P. Xin and C. W. Tu, "GaInNAs/GaAs multiple quantum wells grown by gas-source molecular beam epitaxy", Appl. Phys Lett. vol. 72(19) 2442 (1998).

E. Yablonovitch, T. Sands, D. M. Hwang, I. Schnitzer, T. J. Gmitter, S. K. Shastry, D. S. Hill, and J. C. C. Fan, "Van der Waals bonding of GaAs on Pd leads to a permanent, solid-phase-topotaxial, metallurgical bond", Applied Physics Letters 59 3159 (1991).

Pochi Yeh, Amnon Yariv, and Chi-Shain Hong, "Electromagnetic propagation in periodic stratified media. I. General theory", J. Optical Soc. Am., vol. 67(4) 423 (1977).

Z.-F. Xiao, G.-Y. Wu, D. Zhang, G. Zhang, Z.-H. Li, Y.-L. Hao, and Y.-Y. Wang, "Silicon/glass wafer-to-wafer bonding with Ti/Ni Intermediate bonding", Sensors and Actuators A—Physical 71 123 (1998).

* cited by examiner

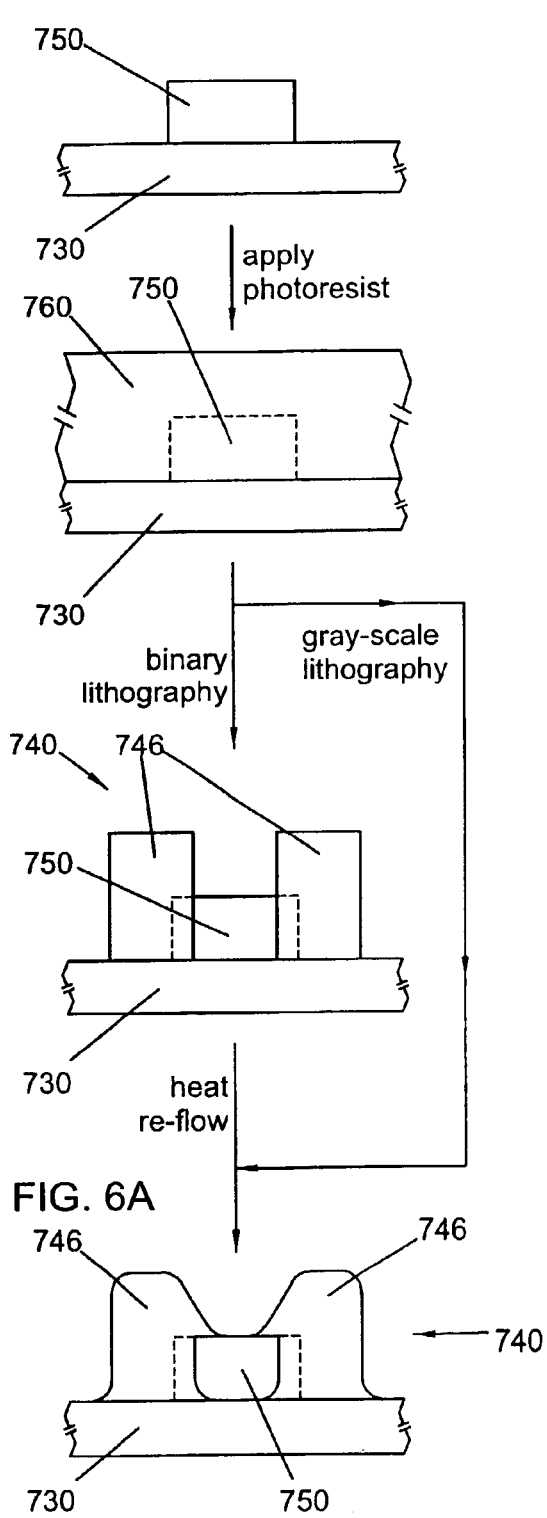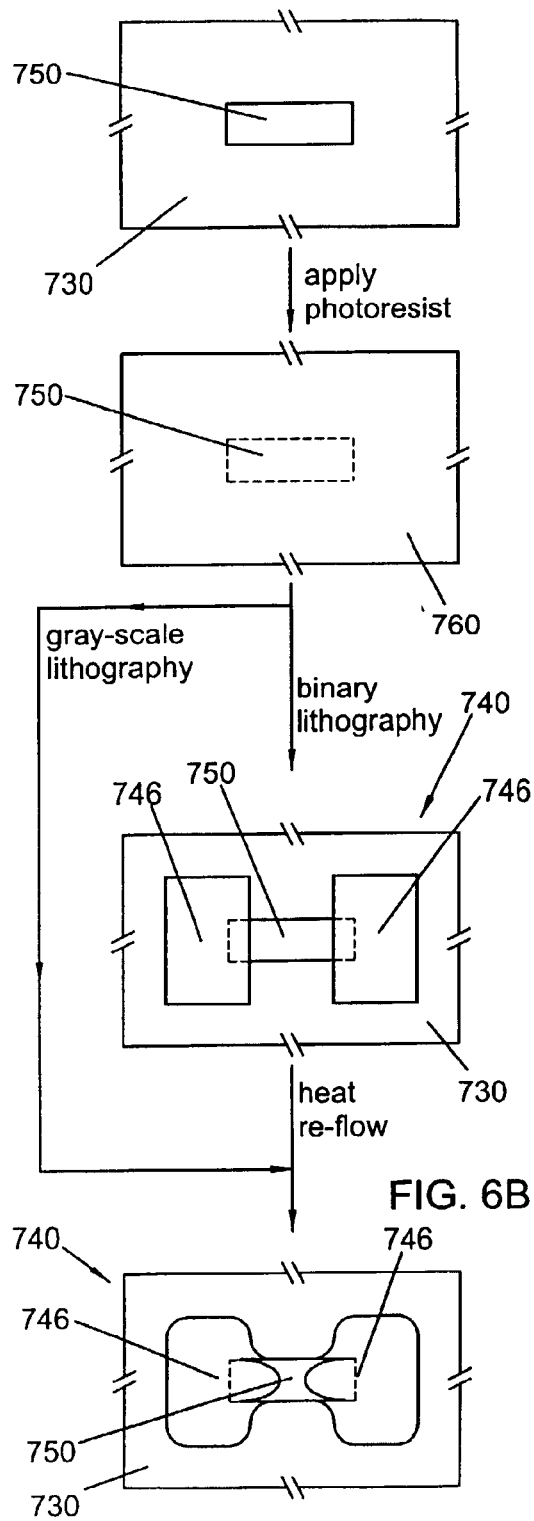
FIG. 6A
FIG. 6B

ALIGNMENT APPARATUS AND METHODS FOR TRANSVERSE OPTICAL COUPLING

RELATED APPLICATIONS

This application claims benefit of prior-filed provisional App. No. 60/333,236 entitled "Alignment apparatus and methods for transverse optical coupling" filed Nov. 23, 2001 in the names of Charles I. Grosjean, Guido Hunziker, Paul M. Bridger, and Oskar J. Painter, said provisional application being hereby incorporated by reference as if fully set forth herein.

FIELD OF THE INVENTION

The field of the present invention relates to transverse optical couplers. In particular, apparatus and methods are described herein for establishing and maintaining alignment of transverse-coupled optical components.

BACKGROUND

This application is related to subject matter disclosed in:

A1) U.S. provisional Application No. 60/183,499 entitled "Resonant optical power control devices and methods of fabrication thereof" filed Feb. 17, 2000 in the names of Peter C. Sercel and Kerry J. Vahala, said provisional application being hereby incorporated by reference in its entirety as if fully set forth herein;

A2) U.S. provisional Application No. 60/226,147 entitled "Fiber-optic waveguides for evanescent optical coupling and methods of fabrication and use thereof" filed Aug. 18, 2000 in the names of Peter C. Sercel, Guido Hunziker, and Robert B. Lee, said provisional application being hereby incorporated by reference in its entirety as if fully set forth herein;

A3) U.S. provisional Application No. 60/257,218 entitled "Waveguides and resonators for integrated optical devices and methods of fabrication and use thereof" filed Dec. 21, 2000 in the name of Oskar J. Painter, said provisional application being hereby incorporated by reference in its entirety as if fully set forth herein;

A4) U.S. provisional Application No. 60/257,248 entitled "Modulators for resonant optical power control devices and methods of fabrication and use thereof" filed Dec. 21, 2000 in the names of Oskar J. Painter, Kerry J. Vahala, Peter C. Sercel, and Guido Hunziker, said provisional application being hereby incorporated by reference in its entirety as if fully set forth herein;

A5) U.S. non-provisional application Ser. No. 09/788,303 entitled "Cylindrical processing of optical media", filed Feb. 16, 2001 in the names of Peter C. Sercel, Kerry J. Vahala, David W. Vernooy, and Guido Hunziker, said non-provisional application being hereby incorporated by reference in its entirety as if fully set forth herein;

A6) U.S. non-provisional application Ser. No. 09/788,331 entitled "Fiber-ring optical resonators", filed Feb. 16, 2001 in the names of Peter C. Sercel, Kerry J. Vahala, David W. Vernooy, Guido Hunziker, and Robert B. Lee, said non-provisional application being hereby incorporated by reference in its entirety as if fully set forth herein;

A7) U.S. non-provisional application Ser. No. 09/788,300 entitled "Resonant optical filters", filed Feb. 16, 2001 in the names of Kerry J. Vahala, Peter C. Sercel, David W. Vernooy, Oskar J. Painter, and Guido Hunziker, said non-provisional application being hereby incorporated by reference in its entirety as if fully set forth herein;

A8) U.S. non-provisional application Ser. No. 09/788,301 entitled "Resonant optical power control device assemblies", filed Feb. 16, 2001 in the names of Peter C. Sercel, Kerry J. Vahala, David W. Vernooy, Guido Hunziker, Robert B. Lee, and Oskar J. Painter, said non-provisional application being hereby incorporated by reference in its entirety as if fully set forth herein;

A9) U.S. provisional Application No. 60/301,519 entitled "Waveguide-fiber Mach-Zender interferometer and methods of fabrication and use thereof filed Jun. 27, 2001 in the names of Oskar J. Painter, David W. Vernooy, and Kerry J. Vahala, said provisional application being hereby incorporated by reference in its entirety as if fully set forth herein;

A10) U.S. provisional application No. 60/322,272 entitled "Fiber-optic-taper probe for characterizing transversely-optically-coupled waveguides and resonators" filed Sep. 13, 2001 in the name of David W. Vernooy, said provisional application being hereby incorporated by reference in its entirety as if fully set forth herein;

A11) U.S. provisional App. No. 60/335,656 entitled "Polarization-engineered transverse optical coupling apparatus and methods" filed Oct. 30, 2001 in the names of Kerry J. Vahala, Peter C. Sercel, Oskar J. Painter, David W. Vernooy, and David S. Alavi, said application being hereby incorporated by reference in its entirety as if fully set forth herein;

A12) U.S. provisional App. No. 60/334,705 entitled "Integrated end-coupled transverse-optical-coupling apparatus and methods" filed Oct. 30, 2001 in the names of Henry A. Blauvelt, Kerry J. Vahala, Peter C. Sercel, Oskar J. Painter, and Guido Hunziker, said application being hereby incorporated by reference in its entirety as if fully set forth herein;

A13) U.S. provisional App. No. 60/333,236 entitled "Alignment apparatus and methods for transverse optical coupling" filed Nov. 23, 2001 in the names of Charles I. Grosjean, Guido Hunziker, Paul M. Bridger, and Oskar J. Painter, said provisional application being hereby incorporated by reference as if fully set forth herein;

A14) U.S. non-provisional application Ser. No. 10/037,966 entitled "Multi-layer dispersion-engineered waveguides and resonators" filed Dec. 21, 2001 in the names of Oskar J. Painter, David W. Vernooy, and Kerry J. Vahala, said application being hereby incorporated by reference in its entirety as if fully set forth herein;

A15) U.S. provisional App. No. 60/360,261 entitled "Alignment-insensitive optical junction apparatus and methods employing adiabatic optical power transfer" filed Feb. 27, 2002 in the names of Henry A. Blauvelt, Kerry J. Vahala, David W. Vernooy, and Joel S. Paslaski, said provisional application being hereby incorporated by reference as if fully set forth herein;

A16) U.S. non-provisional application Ser. No. 10/187,030 entitled "Optical junction apparatus and methods employing optical power transverse-transfer" filed Jun. 28, 2002 in the names of Henry A. Blauvelt, Kerry J. Vahala, David W. Vernooy, and Joel S. Paslaski, said non-provisional application being hereby incorporated by reference as if fully set forth herein;

A17) U.S. non-provisional application Ser. No. 10/243,976 entitled "Fiber-optic-taper probe for characterizing transversely-optically-coupled waveguides and resonators" filed Sep. 13, 2002 in the name of David W. Vernooy, said non-provisional application being hereby incorporated by reference in its entirety as if fully set forth herein; and A18) U.S. non-provisional application Ser. No. 10/284,041 entitled "Polarization-engineered transverse optical coupling apparatus and methods" filed Oct. 30, 2002 in the names of Kerry J. Vahala, Peter C. Sercel, Oskar J. Painter, David W. Vernooy, and David S. Alavi, said application being hereby incorporated by reference in its entirety as if fully set forth herein.

Transverse optical coupling (also referred to as transverse coupling, evanescent optical coupling, evanescent coupling, directional optical coupling, directional coupling, transverse optical power transfer, transverse transfer of optical power, transverse transfer) is discussed at length in several of the prior patent applications cited hereinabove, and the discussion need not be repeated herein. In so-called mode-interference coupling, the efficiency of transverse optical coupling between optical components is determined by the degree of transverse overlap between respective optical modes of the optical components (characterized by a coupling coefficient $\kappa$), by the propagation distance over which the modes overlap (i.e., interaction length L), and by the degree of modal index mismatch (characterized by $\Delta\beta=\beta_1-\beta_2$, the $\beta$'s being the propagation constants for the respective optical modes). In so-called adiabatic coupling, $\kappa$ and $\Delta\beta$ vary gradually over the interaction length L so that substantially complete optical power transfer between the transverse-coupled waveguides occurs over a wider range of interaction lengths and/or relative transverse positions. Techniques and devices for efficient transverse optical coupling (mode-interference coupled or adiabatically coupled) between a fiber-optic taper and an optical waveguide fabricated on a substrate (as so-called planar waveguide) have been developed recently and may find applicability in the telecommunications industry. Examples include semiconductor-based optical multi-layer-reflector (MLR) waveguides and/or resonators as disclosed in applications A3, A9, and A14 cited hereinabove, and external-coupling waveguides as disclosed in applications A12, A15, and A16 cited hereinabove. Methods and apparatus disclosed herein may be suitable for other transversely-optically-coupled optical components as well. Transverse-coupled components may include waveguides wherein confinement of waveguide optical modes is achieved by lower-index cladding layers surrounding a core, distributed Bragg reflection, reflection from metal coatings, reflection from dielectric coatings, reflection from multi-layer coatings, and/or internal reflection from an air/waveguide interface. In order to attain the full potential of many devices employing transverse optical coupling, transverse overlap $\kappa$, interaction length L, and modal index mismatch $\Delta\beta$ (and variations thereof should preferably be engineered for achieving suitably reproducible and stable optical device performance.

Variations in device performance may arise from a number of sources. For example, variations in device performance may arise due to tolerances in fabrication and/or assembly processes, leading to uncertainties in component dimensions, relative positions, and/or modal indices. Variations may also arise through temperature-dependent changes in component dimensions, relative positions, and/or modal-indices, during and/or after fabrication/assembly of the device. After fabrication/assembly of an optical device, mechanical perturbations may lead to variation in relative positions of optical components within a device, in turn causing variations in device performance. Mechanical perturbations may include impact, shock, and/or vibration. Another source of device performance variation particularly relevant to optical devices that include transverse-coupled components is contamination of component surfaces. Transverse-coupled components often may support optical modes having evanescent portions, and such modes are particularly sensitive to contamination of optical component surfaces.

SUMMARY

Certain aspects of the present invention may overcome one or more drawbacks of the previous art and/or advance the state-of-the-art of transverse optical couplers, and in addition may meet one or more of the following objects:

To provide alignment apparatus and methods for transverse optical coupling wherein one or more alignment members may serve to accurately establish relative positioning of transverse-coupled optical components;

To provide alignment apparatus and methods for transverse optical coupling wherein one or more alignment members may serve to stably maintain relative positioning of transverse-coupled optical components;

To provide alignment apparatus and methods for transverse optical coupling wherein one or more alignment members may serve to facilitate assembly of transverse-coupled optical components into an optical device;

To provide alignment apparatus and methods for transverse optical coupling wherein one or more alignment members may serve to reduce or eliminate the need for active alignment of transverse-coupled optical components of an optical device;

To provide alignment apparatus and methods for transverse optical coupling wherein one or more alignment members may serve to enable passive alignment of transverse-coupled optical components of an optical device;

To provide methods for fabricating one or more alignment members for transverse optical coupling;

To provide alignment apparatus and methods for transverse optical coupling wherein one or more alignment members may be fabricated on a common substrate with at least one of the transverse-coupled optical components;

To provide alignment apparatus and methods for transverse optical coupling wherein one or more alignment members may be fabricated on a common substantially planar substrate with at least one of the transverse-coupled optical components;

To provide alignment apparatus and methods for transverse optical coupling wherein one or more alignment members may be accurately aligned on a common substrate with at least one of the transverse-coupled optical components;

To provide alignment apparatus and methods for transverse optical coupling wherein one or more alignment members may be accurately aligned on a common substantially planar substrate with at least one of the transverse-coupled optical components;

To provide alignment apparatus and methods for transverse optical coupling wherein transverse-coupled optical components are embedded within a low-index medium;

To provide alignment apparatus and methods for transverse optical coupling wherein transverse-coupled optical components are embedded within a low-index medium so as to substantially maintain relative positions of the optical components; and To provide alignment apparatus and methods for transverse optical coupling wherein transverse-coupled optical components are embedded within a low-index medium so as to substantially isolate surfaces of the optical components.

One or more of the foregoing object may be achieved by a method for aligning optical components for transverse-optical coupling, comprising the steps of: fabricating a first optical component on a substrate; fabricating an alignment member on the substrate in a pre-determined position relative to the first optical component; and assembling a second optical component onto the alignment member, thereby establishing transverse optical coupling between the first optical component and the second optical component. The substrate is preferably substantially planar. The alignment member may be adapted for receiving the second optical member in substantial mechanical engagement, so as to accurately establish and stably maintain relative transverse positioning of the first optical component and the second optical component. The first optical component and the alignment member may preferably be fabricated on the substrate using precision spatially selective materials processing techniques.

One or more of the foregoing objects may be achieved by an optical device, comprising: a first optical component fabricated on a substrate; an alignment member fabricated on the substrate in a pre-determined position relative to the first optical component; and a second optical component transverse-coupled to the first optical component. The substrate is preferably substantially planar. The second optical component may be received by and substantially mechanically engaged with the alignment member, so as to accurately establish and stably maintain relative transverse positioning of the first optical component and the second optical component.

One or more of the foregoing objects may be achieved in the present invention by a method for assembling an optical device, the optical device including a first optical component and a second optical component transverse-coupled thereto, the method comprising the steps of positioning the second optical component relative to the first optical component so as to establish transverse optical coupling therebetween; and substantially embedding transverse-coupled portions of the first and second transverse-coupled optical components in a substantially solid substantially transparent low-index medium while maintaining relative positioning and transverse optical coupling of the first and second optical components. The embedding medium may preferably have a refractive index lower than refractive indices of the first and second optical components.

One or more of the foregoing objects may be achieved by an optical device, comprising: a first optical component; a second optical component positioned relative to the first optical component so as to establish transverse optical coupling therebetween; and a substantially solid substantially transparent low-index medium substantially surrounding transverse-coupling portions of the first and second optical components, thereby substantially maintaining relative positions thereof. The embedding medium may preferably have a refractive index lower than refractive indices of the first and second optical components.

Additional objects and advantages of the present invention may become apparent upon referring to the preferred and alternative embodiments of the present invention as illustrated in the drawings and described in the following written description and/or claims.

BRIEF DESCRIPTION OF THE DRAWINGS

FIGS. 6A and 6 are process diagrams illustrating transverse-coupling alignment apparatus and methods according to the present invention.

Figure 1:
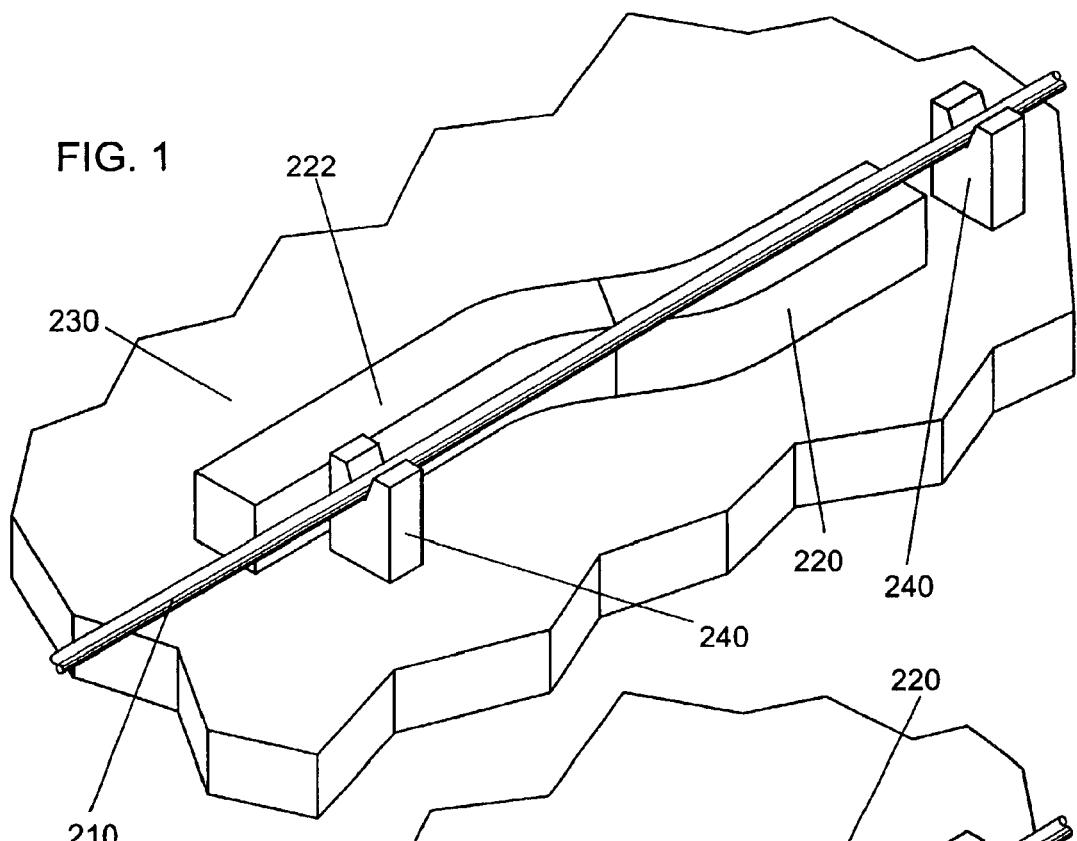
FIG. 1 is an isometric view of an exemplary transverse-coupled optical device employing alignment apparatus and methods according to the present invention.

In various Figures in which a fiber-optic-taper waveguide is shown, only a central portion of the taper is shown. The diameter of this central portion is substantially constant with respect to longitudinal position along the taper, and its diameter typically corresponds to the minimum diameter attained by the taper along its entire length. Portions of the taper having diameters increasing or decreasing with respect to longitudinal position would typically fall outside the views shown in the Figures.

DETAILED DESCRIPTION OF EMBODIMENTS

The term "optical waveguide" (or equivalently, "waveguide") as employed herein shall denote a structure adapted for supporting one or more propagating optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may therefore vary along the length of a curvilinear waveguide, for example. Examples of optical waveguides may include, without being limited to, various types of optical fiber and various types of planar waveguides. The term "planar optical waveguide" (or equivalently, "planar waveguide") as employed herein shall denote any optical waveguide that is provided on a substantially planar substrate. The longitudinal dimension (i.e., the propagation dimension) shall be considered substantially parallel to the substrate. A transverse dimension substantially parallel to the substrate may be referred to as the horizontal dimension (with associated terms "horizontal", "side", "lateral", "medial", "right", "left", and so forth), while a transverse dimension substantially perpendicular to the substrate may be referred to as the vertical dimension (with associated terms "vertical", "top", "bottom", "upper", "lower", and so forth). Examples of such waveguides include ridge waveguides, buried waveguides, semiconductor waveguides, other high-index waveguides ("high-index" being above about 2.5), silica-based waveguides, polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, non-linear-optical (NLO) materials, and myriad other examples not explicitly set forth herein which may nevertheless fall within the scope of the present disclosure and/or appended claims. Many suitable substrate materials may be employed, including semiconductor, crystalline, silica or silica-based, other glasses, ceramic, metal, and myriad other examples not explicitly set forth herein which may nevertheless fall within the scope of the present disclosure and/or appended claims.

One exemplary type of planar optical waveguide that may be suitable for use with optical components disclosed herein is a so-called PLC waveguide (Planar Lightwave Circuit). Such waveguides typically comprise silica or silica-based waveguides (often ridge or buried waveguides; other waveguide configuration may also be employed) supported on a substantially planar silicon substrate (typically with an interposed silica or silica-based optical buffer layer). Sets of one or more such waveguides may be referred to as planar waveguide circuits, optical integrated circuits, or opto-electronic integrated circuits. PLC waveguides offer several advantages within the context of the present disclosure. Silicon is a suitable waveguide substrate material for a variety of reasons, including but not limited to: well-understood material processing techniques; mature industry standards for materials and processing; highly planar single crystal faces obtainable; amenable to selective dry- and/or wet-etching; highly rigid; desirable thermal characteristics. Silica and silica-based materials are well-understood optical materials for fabricating waveguides, and have optical properties comparable to those of most single- and multi-mode optical fibers. A PLC substrate with one or more PLC waveguides may be readily adapted (according to the teachings of earlier-cited U.S. App. No. 60/334,705, U.S. App. No. 60/360,261, and/or U.S. application Ser. No. 10/187, 030) for mounting one or more optical sources, lasers, modulators, and/or other optical devices adapted for transverse-transfer of optical power with a suitably adapted PLC waveguide (mode-interference-coupled, or substantially adiabatic, transverse-transfer). A PLC substrate with one or more PLC waveguides may be readily adapted (according to the teachings of earlier-cited U.S. App. No. 60/413,986 and/or U.S. App. No. 60/417,805) for mounting one or more optical detectors, optical components of various sorts, and/or optical fibers adapted for end-transfer of optical power with a suitably adapted PLC waveguide. Reflective and/or transmissive optical components as disclosed herein may be readily employed with one or more suitably adapted PLC waveguides.

For purposes of the present written description and/or appended claims, "spatially-selective material processing techniques" shall encompass lithography, photolithography, evaporative deposition, sputtering, chemical vapor deposition, beam deposition, beam-assisted deposition, ion beam deposition, ion-beam-assisted deposition, wet etching, dry etching, ion milling, laser machining, spin deposition, spray-on deposition, electrochemical plating or deposition, electroless plating, photo-resists, UV curing and/or densification, micro-machining using precision saws and/or other mechanical cutting/shaping tools, any other suitable spatially-selective material processing techniques, combinations thereof, and/or functional equivalents thereof. In particular, it should be noted that any step involving "spatially-selectively providing" a layer or structure may involve either or both of: spatially-selective deposition, or substantially uniform deposition (over a given area) followed by spatially-selective removal. Any spatially-selective deposition, removal, or other process may be a so-called direct-write process, or may be a masked process.

A significant source of variation in the performance of optical devices that include one or more transverse-coupled optical components is the variation in relative transverse positioning of the transverse-coupled components. Variations in relative transverse positioning of the components result in variations in the transverse coupling coefficient K, in turn leading to variations in the efficiency of transfer of optical power between the transverse-coupled optical components. Variations in relative transverse position may arise due to manufacturing tolerances during fabrication/assembly of the optical device, or may arise after manufacture as a result of mechanical and/or thermal perturbations of the optical device.

Figure 2:
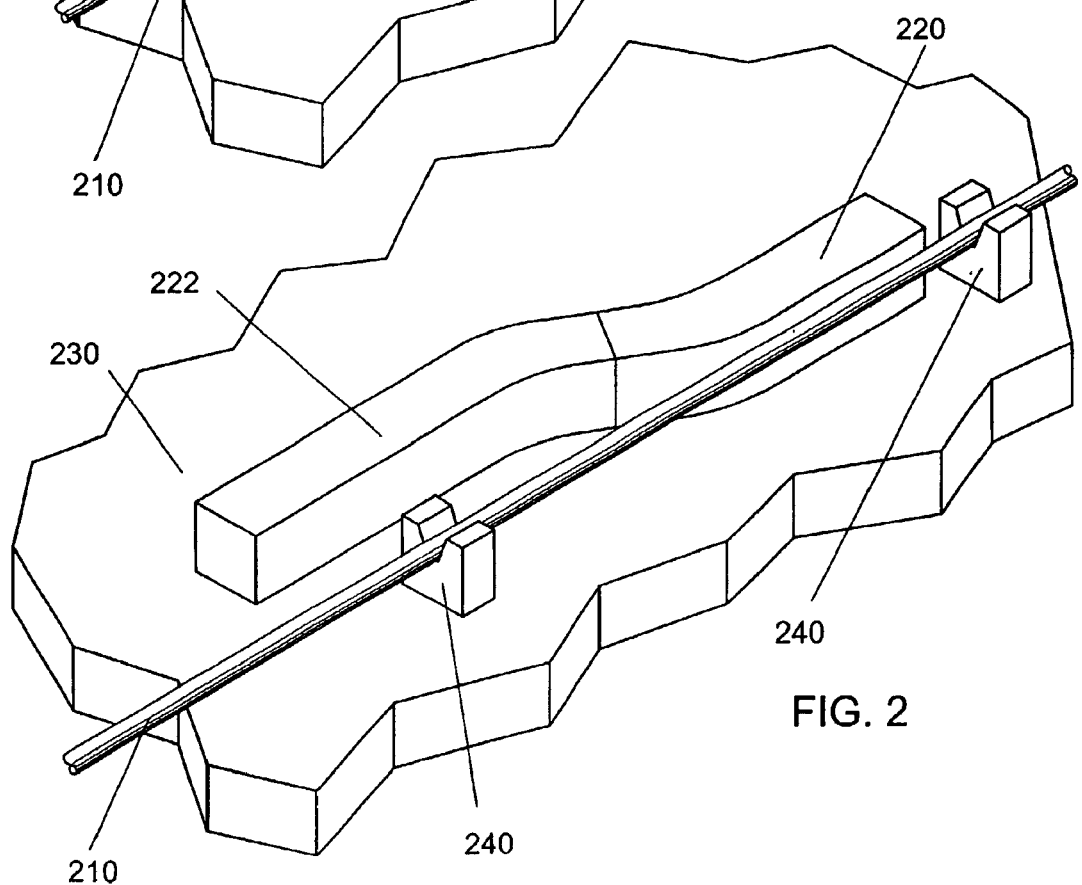
FIG. 2 is an isometric view of an exemplary transverse-coupled optical device employing alignment apparatus and methods according to the present invention.
Figure 3:
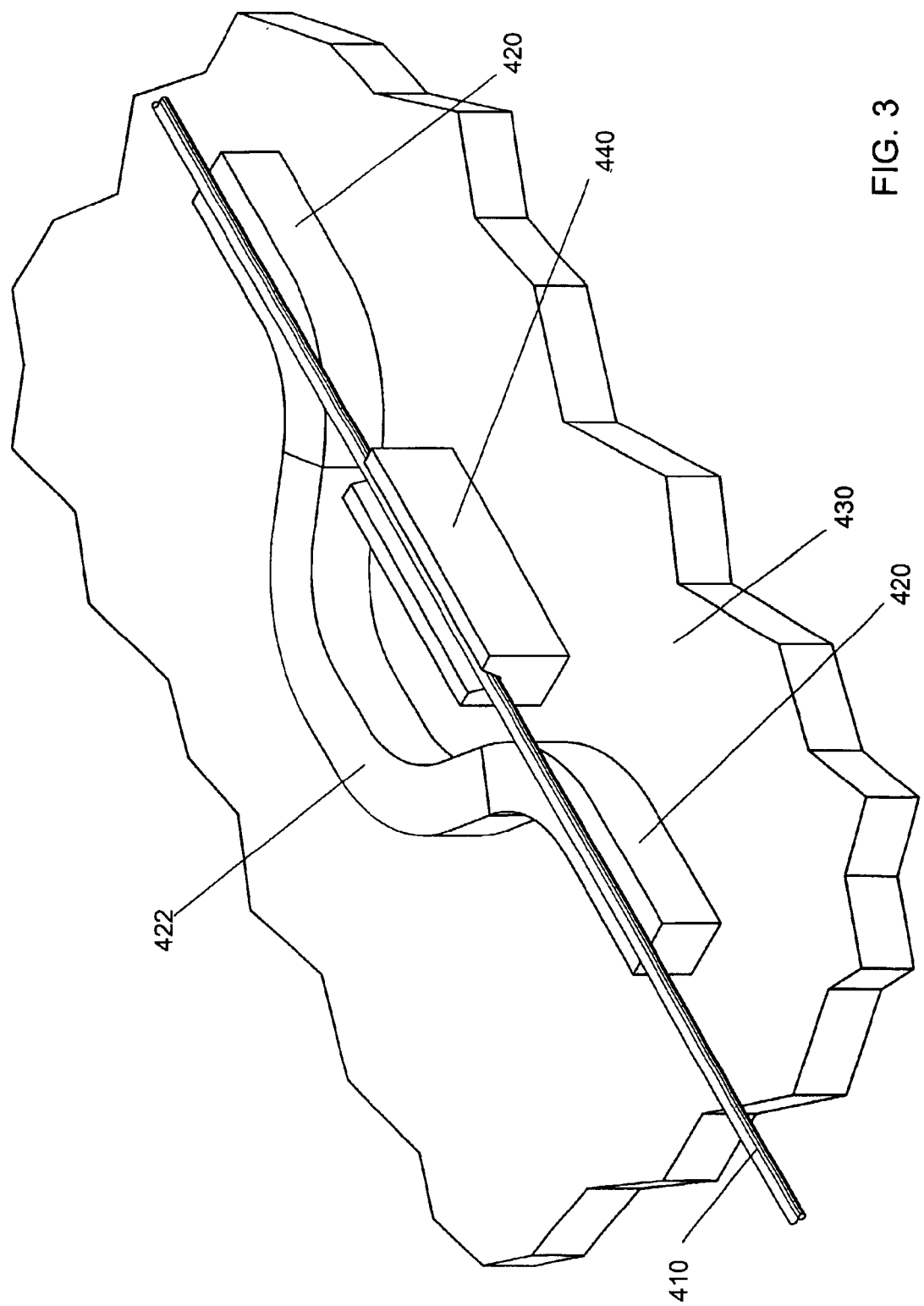
FIG. 3 is an isometric view of an exemplary transverse-coupled optical device employing alignment apparatus and methods according to the present invention.
Figure 4:
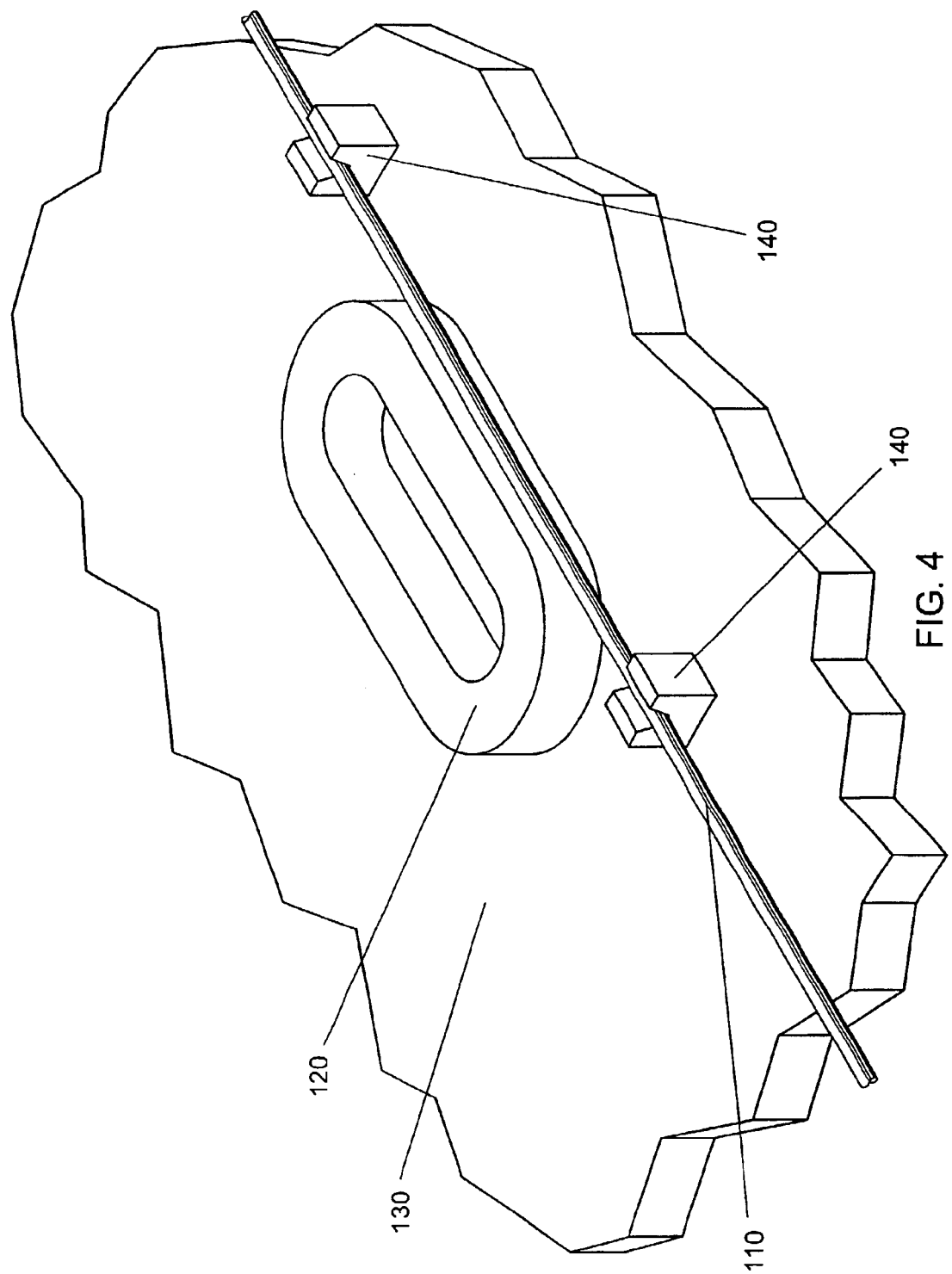
FIG. 4 is an isometric view of an exemplary transverse-coupled optical device employing alignment apparatus and methods according to the present invention.

FIGS. 1–4 show various examples of an optical component transverse-coupled to a fiber-optic-taper transmission waveguide. In FIG. 1, a fiber-optic taper 210 is shown surface-coupled to an external-coupling waveguide 220 fabricated on substrate 230 along with optical component 222. Alignment members 240 serve to align fiber-optic taper 210 with respect to waveguide 220 in both transverse dimensions (i.e., height above the surface of waveguide 220 and relative horizontal positions of waveguide 220 and taper 210). FIG. 2 shows similar waveguide and taper in a side-coupled arrangement. In FIG. 3, two external-coupling waveguides 420 are shown fabricated on a substrate 430 along with an optical component 422. Fiber-optic taper 410 is shown surface-coupled to external-coupling waveguides 420. A single elongated alignment member 440 serves to align taper 410 with respect to waveguides 420 in both transverse dimensions. In FIG. 4, a fiber-optic taper 110 is shown side-coupled to a resonator 120 fabricated on substrate 130. Alignment members 140 serve to align fiber-optic taper 110 with respect to resonator 120 in both transverse dimensions (i.e., height from the surface of substrate 130 and relative horizontal positions of resonator 120 and taper 110).

Figures 5A, 5B:
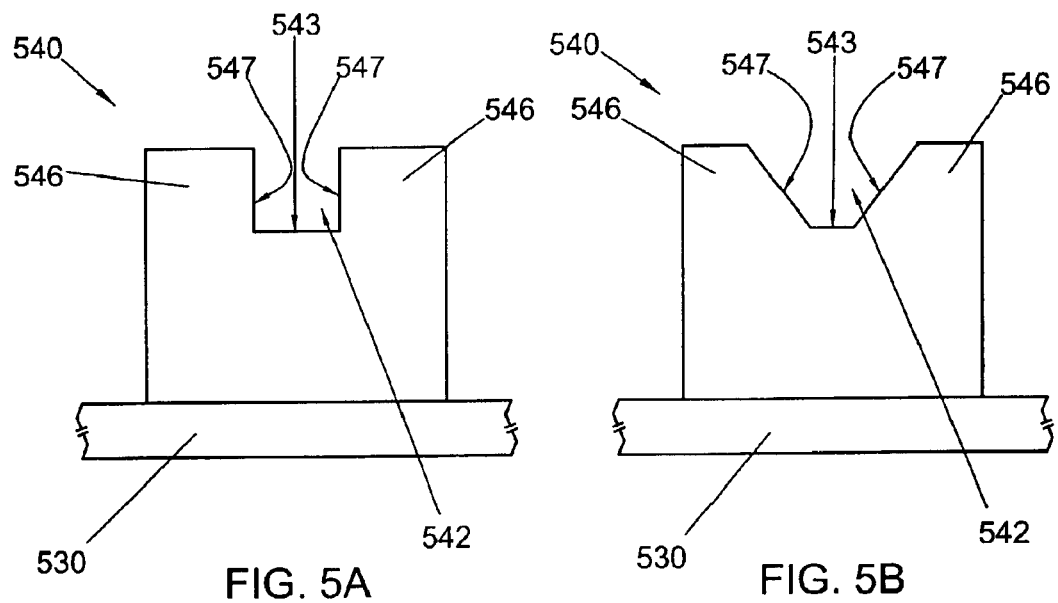
FIGS. 5A and 5B are end views of transverse-coupling alignment members according to the present invention.

In these examples and other similarly configured embodiments, the alignment members typically have a notch or groove for receiving a transverse-coupled optical component, as illustrated by embodiments of alignment member 540 shown in FIGS. 5A and 5B on a substrate 530. A typical alignment member 540 according to the present invention may include a medial notch or groove 542 (delimited at a lower end by a bottom alignment surface 543) between laterally-positioned upward protrusions 546 (with lateral alignment surfaces 547 delimiting medial notch/groove 542). Contact (preferably) or near-contact between a fiber-optic taper (or other transverse-coupled component) with surface 543 serves to accurately position taper at a pre-determined height above a substrate 530 (and above a transverse-coupled optical component in a surface-coupled configuration). Contact (preferably) or near-contact between taper (or other transverse-coupled component) and lateral surfaces 547 serves to accurately position taper at a predetermined transverse horizontal position relative to the transverse-coupled optical component. Alignment member 540 therefore serves to accurately establish and stably maintain relative transverse positioning of the transverse-coupled optical components. Notch/groove 542 serves to facilitate assembly of an optical device that includes transverse-coupled optical components by receiving the taper (or other transverse-coupled component) and guiding it into its proper position substantially mechanically engaged (near contact or, preferably, in contact) with surfaces 543 and 547. Alignment member 540 may be sufficiently accurately positioned with respect to one of the transverse-coupled optical components so that the need for active alignment of the transverse-coupled components is substantially reduced or eliminated. Passive alignment procedures may preferably be utilized instead, and are less costly, less labor-intensive, and less time-consuming. Lateral surfaces 547 may be substantially vertical (FIG. 5A), or may be sloped to provide a widened upper end of notch/groove 542 (FIG. 5B), thereby facilitating placement of a taper or other waveguide within notch/groove 542.

Accurate positioning of an alignment member relative to one of the transverse-coupled optical components may preferably be achieved by fabrication of the alignment member on a common substrate with the transverse-coupled component, concurrently and/or sequentially. The substrate is preferably substantially planar. Precision material processing techniques (including lithography, deposition, masking, etching, and/or related techniques) may be employed for fabricating both the transverse-coupled optical component and one or more alignment members on a common substrate. Such precision processing techniques readily enable accurate relative positioning of the alignment member(s) relative to the transverse-coupled optical component, and may be readily implemented for wafer-scale fabrication of many optical components and corresponding alignment members simultaneously, before the wafer is cleaved or otherwise divided to yield individual devices.

FIGS. 6A and 6B are process diagrams (end and top views, respectively) for a method according to the present invention for fabricating one or more alignment members for transverse-optical coupling. An optical component to be transverse-coupled (a waveguide in this example) is fabricated on a substrate 730 using precision material processing techniques, typically spatially-selective removal of material from substrate 730, leaving a protruding waveguide formed by remaining substrate material. Equivalently, such a protruding waveguide (or other optical component) may be fabricated by spatially selective deposition of material onto the substrate. In addition to the waveguide, one or more support members 750 are similarly fabricated on substrate 730 (preferably concurrently using the same material removal and/or deposition processes used to fabricate the optical component; this need not always be the case, and sequential fabrication processes may be equivalently employed). Each of the protruding support member(s) 750 forms the basis for an alignment member 740, with a medial portion of an upper surface of the support member 750 forming a bottom alignment surface. For surface-coupling, support member(s) 750 may preferably be substantially the same height as the waveguide, which may be readily achieved when the waveguide and support member(s) 750 are fabricated concurrently with the same materials. For side-coupling, support member(s) 750 are fabricated to a height shorter than the waveguide. For a concurrent mask-and-etch fabrication scheme, a mask may be removed from support member(s) 750 at an intermediate point during the etch, and then the etch may be continued until the desired depth is reached. The point during the etch at which the mask is removed from support member(s) 750 determines the relative heights of support member(s) 750 and the waveguide, which may be precisely determined from etch times and well-characterized etch rates. For a concurrent mask-and-deposit fabrication scheme, additional mask material may be deposited on support member(s) 750 at an intermediate point during the deposition, and then the deposition may be continued until the desired height is reached. The point during the deposition at which the mask is deposited on the support member(s) 750 determines the relative heights of support member(s) 750 and the waveguide after lift-off of the mask, which may be precisely determined from deposition times and well-characterized deposition rates.

Figures 7, 8:
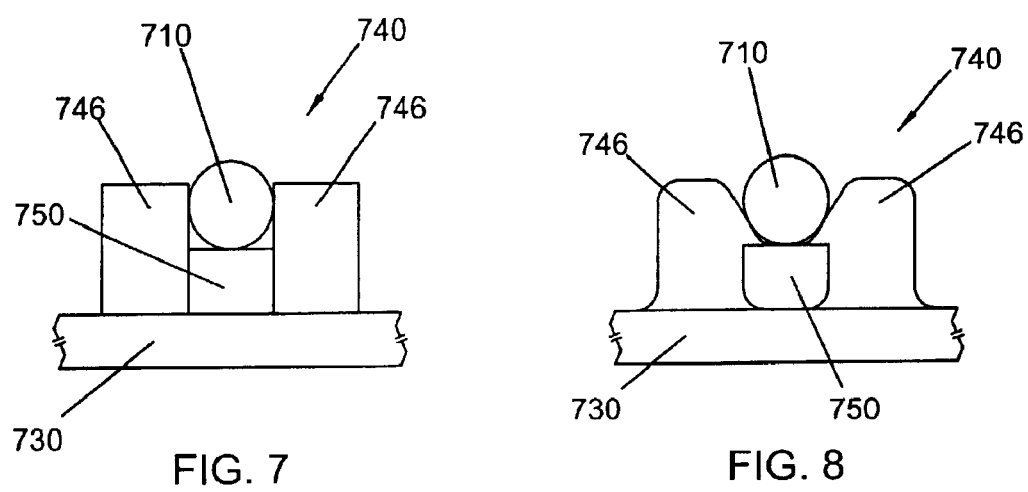
FIG. 7 is an end view of a transverse-coupling alignment member and an optical component engaged therewith according to the present invention.
FIG. 8 is an end view of a transverse-coupling alignment member and an optical component engaged therewith according to the present invention.

Once support member(s) 750 have been fabricated to the desired height, upward protrusions 746 may be added for forming a notch/groove with corresponding lateral alignment surfaces. Additional precision material processing steps may be employed for fabricating protrusions 746 by spatially-selective material deposition. In one embodiment of the present invention, the substrate 730 (along with the waveguide and support member(s) 750) is coated with photoresist layer 760, which is then patterned and developed so that the photoresist remaining forms the upward protrusions 746 and the corresponding lateral alignment surfaces. During assembly of an optical device, a fiber-optic taper 710 may be placed within the notch/groove formed by support member 750 and protrusions 746 (FIGS. 7 and 8). Mechanical contact and/or near-contact between the taper 710 and bottom and/or lateral surfaces of the notch/groove serves to accurately establish and stably maintain relative transverse positioning of the waveguide (or other optical component fabricated on substrate 730) and taper 710. Additional techniques may be employed for facilitating assembly of the optical device. For example, vibration of the substrate may be employed to cause the taper to settle to the bottom of the notch/groove, and/or electrostatic forces may be manipulated and employed for positioning the taper in the notch/groove and/or against the transverse-coupled waveguide or other component. Depending on the nature of the photoresist and the patterning and/or developing techniques employed, surfaces 747 may be substantially vertical (FIG. 7) or may be inclined to form an downwardly narrowed notch/groove (FIG. 8). In either case, the dimensions of the notch/groove preferably result in substantial mechanical engagement of taper 710 within the notch/groove (at the bottom and lateral surfaces thereof), in turn providing accurately established and stably maintained relative transverse positioning and transverse optical coupling between taper 710 and the waveguide.

A notch/groove in alignment member 740 having sloped lateral surfaces and a widened upper end may be fabricated in a variety of ways while remaining within the scope of the present invention. Heating the alignment member 740 of FIG. 7 to near the melting temperature of the developed photoresist forming protrusions 746 may cause them to soften and reflow, transforming substantially vertical lateral surfaces into sloped surfaces as shown in FIG. 8. Depending on the viscoelastic and wetting properties of the photoresist in contact with the support member material, the resulting reflow may produce a broadened opening at the upper end of the notch/groove (FIGS. 6A, 6B, and 8). This widened upper end facilitates placement of the taper 710 on the notch/groove 16 and serves to guide the taper downward into substantial engagement with bottom and/or lateral surfaces of the notch/groove. Experimentation is required to determine, for a given photoresist/support-member-material combination, suitable starting position, shape, and dimensions for protrusions 746 and suitable heating conditions (temperature and duration) to achieve the desired shape for protrusions 746 and the notch/groove.

Alternatively, the sloped lateral surfaces of the groove may be directly fabricated using so-called gray-scale lithographic techniques for exposing and developing the photoresist. So-called binary lithographic exposure and processing of the photoresist (exposed or not; photoresist removed substantially completely or not during developing) may be employed to produce the alignment member 740 having substantially vertical lateral surfaces, as in FIG. 7. Gray-scale lithographic techniques may be employed to produce photoresist of varying thickness upon developing, thereby directly forming an alignment member 740 as in FIG. 8 without the need for reflow of the photoresist. The gray-scale lithography may be achieved by spatially varying the exposure duration for the photoresist, and/or by spatially varying the exposure intensity for the photoresist. In either case, upon development of the photoresist a spatially varying thickness of photoresist will remain, forming sloped lateral alignment surfaces as desired. The gray scale is typically discrete in the case of variable exposure times, but may be discrete or continuous depending on whether a discrete or continuous a gray-scale exposure mask is employed for spatially varying the exposure intensity. For continuous gray-scale lithography, the sloped lateral alignment surfaces may be substantially smooth. For discrete gray-scale lithography, the sloped lateral alignment surfaces may be step-like. These steps may be smoothed by reflow of the photoresist after exposure and developing. The amount of reflow required is substantially less than that required to transform vertical surfaces to sloped surfaces (as described in the preceding paragraph) and should be more easily characterized and reproduced based on the form of the step-like lateral surface.

Figure 9:
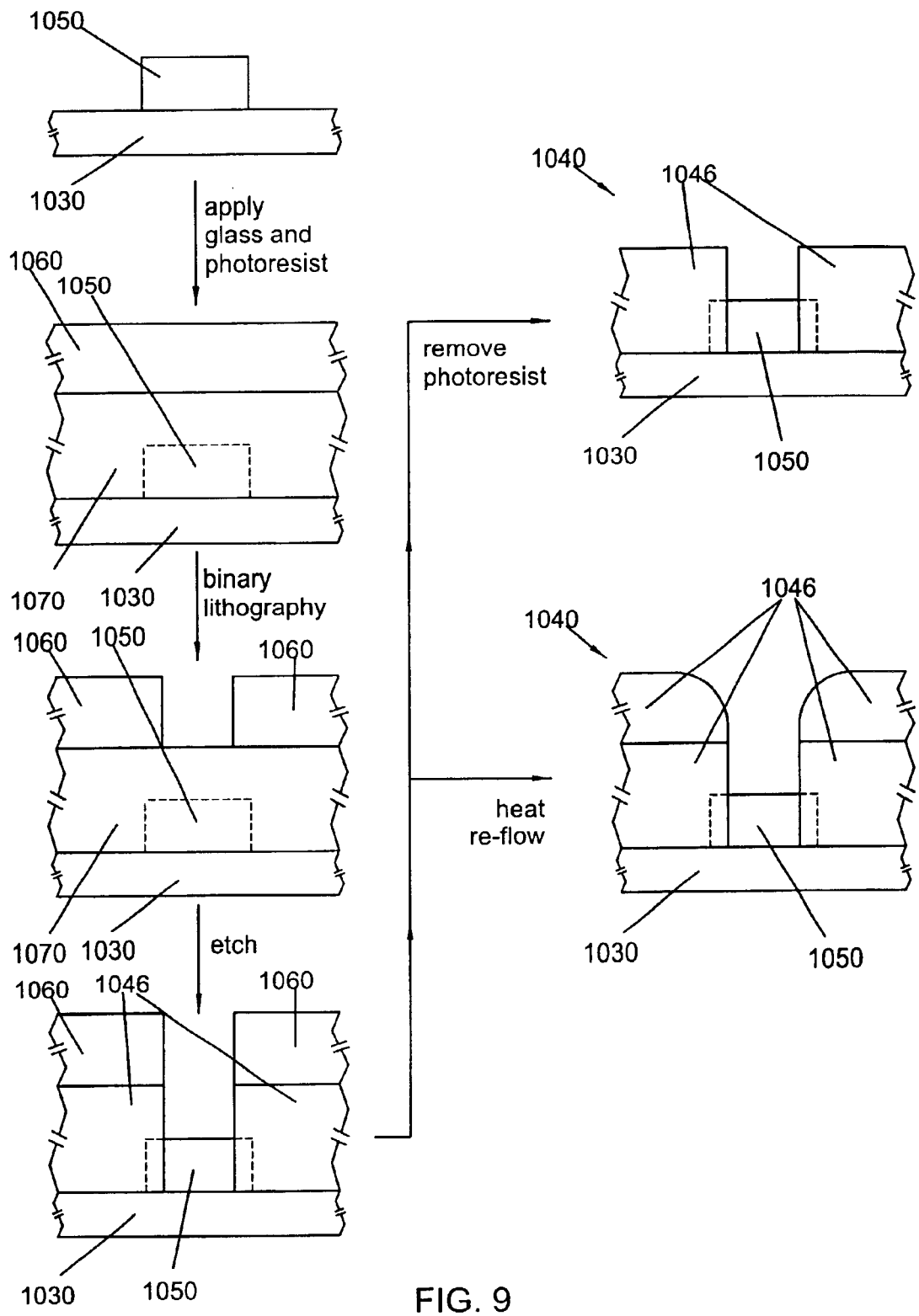
FIG. 9 is a process diagram illustrating transverse-coupling alignment apparatus and methods according to the present invention.

Variations on the embodiments of FIGS. 6A, 6B, 7, and 8 are shown being fabricated in the process diagram of FIG. 9. One or more support members 1050 may be fabricated on substrate 1030, in any manner as described hereinabove, along with an optical component (a resonator for example; not shown). Instead of using photoresist to form protrusions 1046, protrusions 1046 may be formed by spatially selective addition of some other suitable material (such as silica or a silica-based material, silicon nitride or a silicon-nitride-based material, a polymer or polymer-based material, or some other suitable material) onto support member 1050 and/or substrate 1030. The protrusions may be formed by substantially uniform coating of the substrate area around the support member(s) 1050 with the desired material 1070 and photo resist 1060, followed by binary lithography of the photoresist 1060 and spatially selective removal (etching) of much of the material 1070, leaving behind protrusions 1046. Alternatively, substantially the entire substrate may be masked, leaving only the site of the protrusions exposed. The material for protrusions 1046 may then be spatially-selectively deposited, and the mask removed by a lift-off process. Depending on the particular etch processes used, the resulting notch/groove and corresponding lateral alignment surfaces may be substantially vertical or may be inclined to form a widened upper end of the notch/groove. If a coat/mask/etch fabrication scheme is employed using a photoresist for a mask (as in FIG. 9), the remaining photoresist may be removed, or alternatively may be reflowed to form a widened upper end of the notch/groove (FIG. 9).

Figure 10:
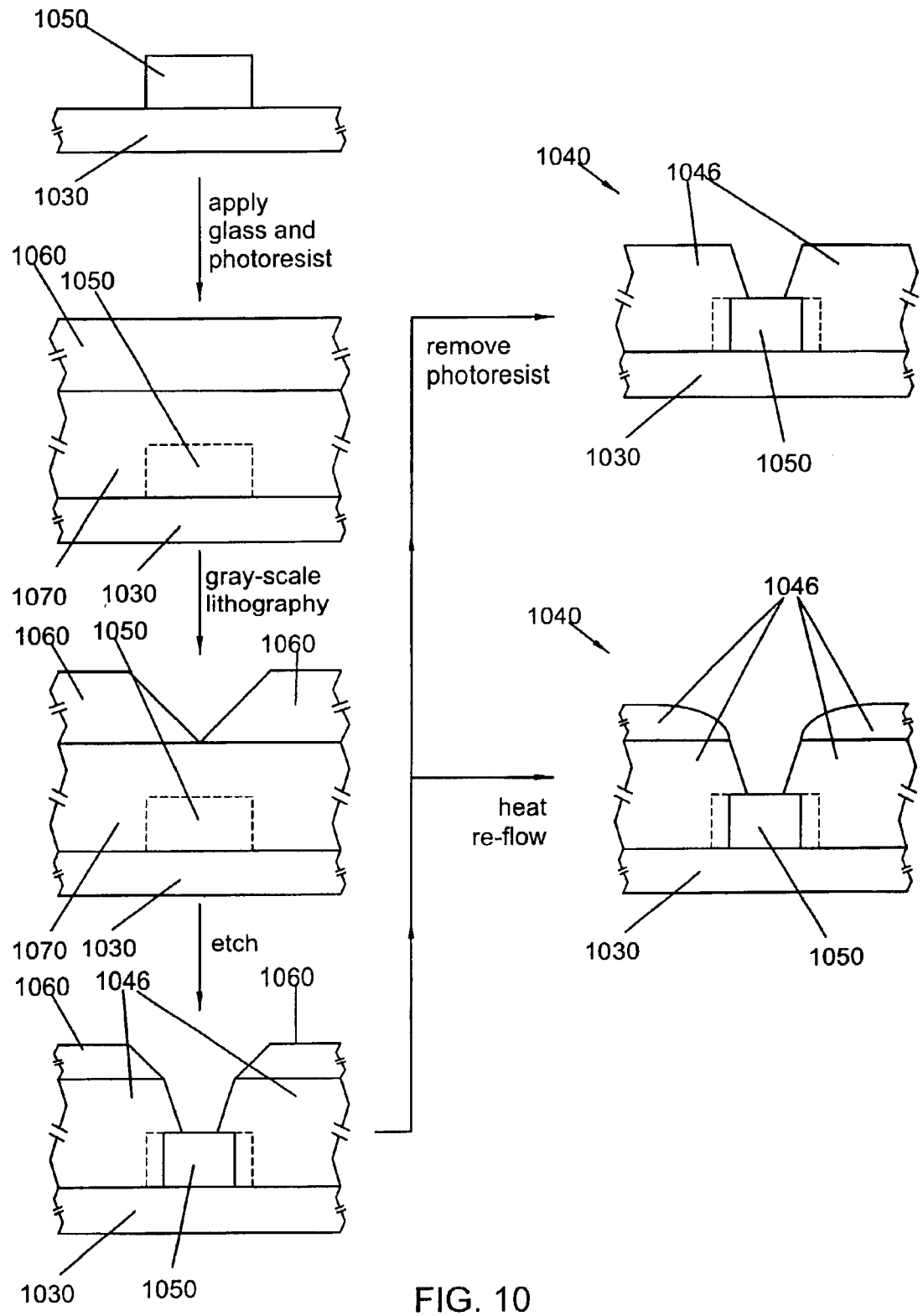
FIG. 10 is a process diagram illustrating transverse-coupling alignment apparatus and methods according to the present invention.

An alternative fabrication procedure employing gray-scale lithography techniques for producing an etch mask is illustrated in FIG. 10. Gray-scale exposure and developing may be employed for preparing an etch mask having a spatially varying thickness of photoresist layer 1060. A vertical etching process may be employed that etches both the photoresist and material layer 1070, perhaps at different rates. Such vertical etching processes may include ion beam etching, reactive ion etching, plasma etching, and so on. The spatially varying thickness of photoresist etch mask 1060 results in spatially varying etch times for material layer 1070, thereby creating sloped lateral alignment surfaces as desired. Any remaining photoresist may also have sloped lateral surfaces (substantially the same slope as layer 1070 if the etch rates are substantially the same; more shallow if the photoresist etch rate is slower; more steep if the photoresist etch rate is faster). These sloped portions of the photoresist may be left in place to form a portion of protrusions 1046 (either with or without reflow and reshaping of the photoresist), or may be substantially completely removed leaving only portions of material layer 1070 to form protrusions 1046.

The accuracy of relative vertical positioning of the alignment members with the transverse-coupled optical component is determined by the accuracy of etch/deposition times and etch/deposition rates, except in the case where the transverse-coupled component and the support members begin at the same height. To take full advantage of this accuracy, it is preferred that a fiber-optic taper or other transverse-coupled component be substantially mechanically engaged with a bottom surface of a notch/groove of an alignment member. It is possible, however, to implement an alignment member according to the present invention wherein the transverse-coupled component engages only the lateral alignment surfaces. The accuracy of relative horizontal positioning of alignment members with the transverse-coupled optical component on the substrate in the foregoing methods relies on the relative accuracy of various spatially-selective processing steps. For example, separate masking steps may be required to position the optical component on the substrate and then position the upward protrusions on the alignment member(s), and the accuracy of the relative component/alignment member position is limited by the relative accuracy of these two masking steps.

It may be desirable to limit the longitudinal extent of contact or near-contact between an alignment member according to the present invention and the transverse-coupled optical component engaged therewith, thereby reducing alignment-member-induced optical loss. While minimizing the longitudinal extent of this contact or near-contact, it may nevertheless be desirable to also provide a greater degree of mechanical contact between the alignment member and the underlying substrate. As shown in FIG. 6B, this may be achieved by providing longitudinally-extending lateral portions of alignment member 740. Under other circumstances, it may be desirable to provide optical loss for a mechanically-engaged transverse-coupled component. Such an example is shown in FIG. 3, which shows alignment member 440 mechanically engaged with fiber-optic taper 410 over a relatively long segment thereof. Optical loss induced by alignment member 440 may be sufficiently larger so as to substantially prevent optical transmission through fiber-optic taper 410, thereby only permitting optical transmission between ends of taper 410 through transverse-coupled waveguides 420 and optical component 422.

Figure 11:
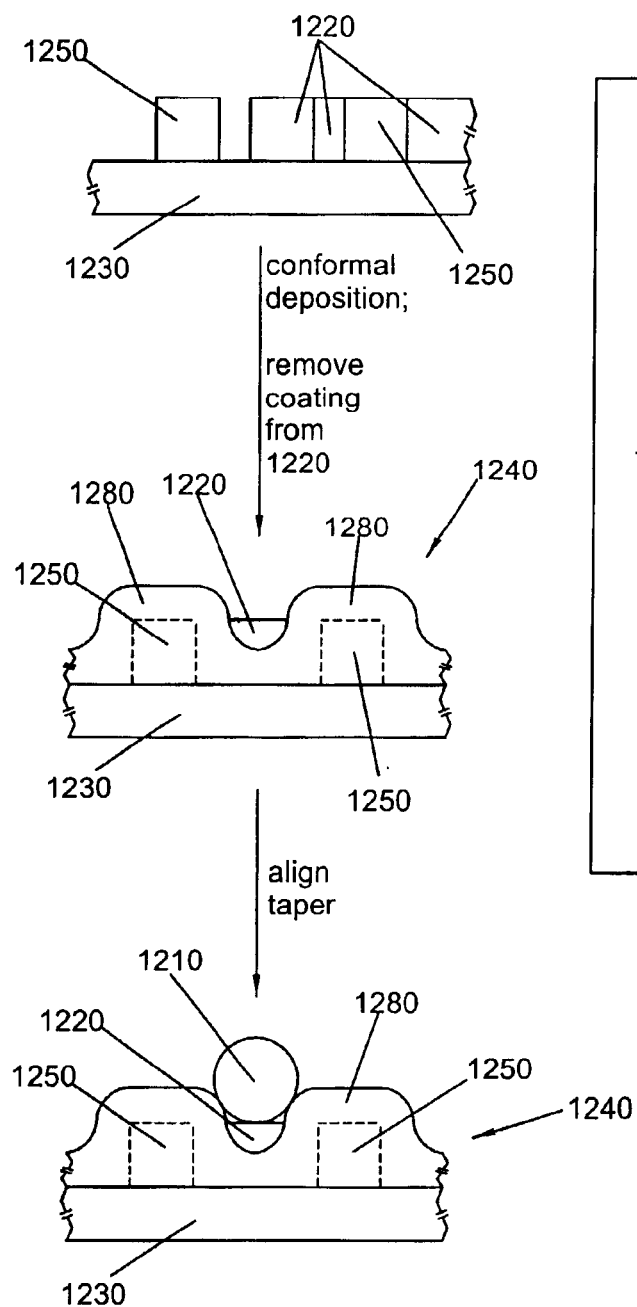
FIG. 11 is a process diagram illustrating transverse-coupling alignment apparatus and methods according to the present invention.
Figure 12:
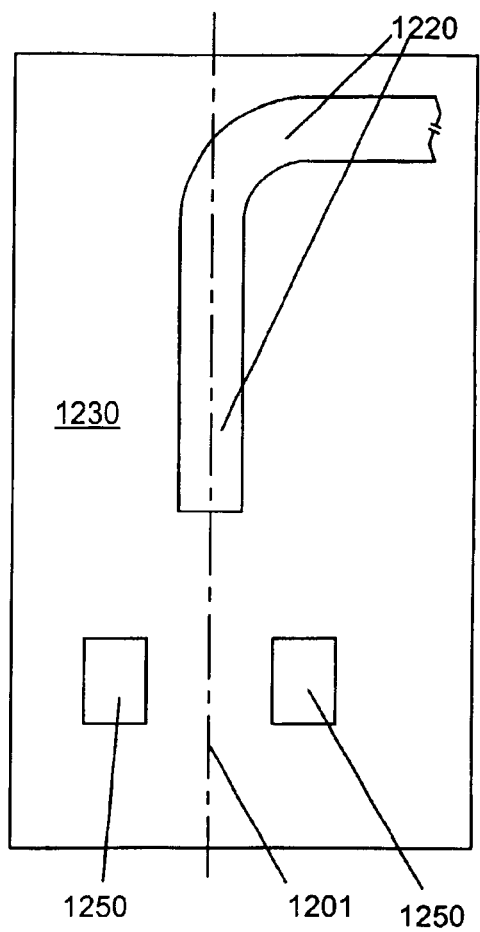
FIG. 12 is a top view of alignment base members and an optical component on a substrate according to the present invention.

In an alternative alignment-member fabrication method according to the present invention, the relative positions of the optical component and the alignment member may be determined by a single spatially-selective processing step, thereby ensuring the accuracy of relative horizontal positions to a degree similar to the accuracy with which processing masks may be fabricated. As illustrated in FIG. 11 (process diagram) and FIG. 12, both the optical component (waveguide 1220 in this example) and paired alignment base members 1250 are fabricated concurrently, employing spatially-selective removal of material from or deposition of material onto substrate 1230. Alignment base members are oppositely laterally displaced relative to a longitudinal axis 1201, axis 1201 being defined by the eventual position of a fiber-optic taper 1210 (or other transverse-coupled component) to be transverse-coupled to a transverse-coupling segment of component 1220. The midpoint of the gap between the alignment base members 1250 preferably substantially coincides with axis 1201. After fabrication of waveguide 1220 and alignment base members 1250, substantially the entire substrate is coated conformally by a suitable material. Conformal coating or deposition here denotes a deposition process that proceeds at a substantially uniform rate in a direction locally normal to the surface being coated (including portions of the surface that are substantially vertical). Vapor deposition processes are typically conformal, as opposed to beam deposition processes which typically proceed in a direction substantially parallel to the beam direction. Examples of materials suitable for vapor deposition may include silica and silica-based materials, silicon nitride and silicon-nitride-based materials, polymers and polymer-based materials (poly-para-xylylene is one example of a suitable polymeric material), or other suitable materials. Once a desired conformal coating thickness has been reached, the coated material 1280 is spatially-selectively removed preferably from substantially the entire substrate except for a small area encompassing each alignment member 1240. The degree of spatial selectivity required for this step is substantially lower than that required for accurately positioning the alignment base members 1250 relative to component 1220. The coating material remaining need only substantially encompass each pair of alignment base members 1250. A fiber-optic taper 1210 may be positioned within the notch/groove formed by the conformal coating and tangentially engage curved surfaces thereof.

The accuracy of relative horizontal positioning in the foregoing methods is limited only by the accuracy with which a single mask (for both a transverse-coupled component 1220 and the alignment base members 1250) may be fabricated. The accuracy of relative vertical positioning of the transverse-coupled component 1220 on the substrate 1230 and alignment member(s) 1240 depends on the accuracy with which conformal deposition rates and deposition times may be determined and/or characterized.

A widened upper end may be provided for the notch/groove in alignment member 1240 in a manner similar to that described hereinabove and shown in FIGS. 6A, 6B, 9, and 10. Photoresist on alignment members 1240 may be heated and allowed to reflow to form a widened upper end of the notch/groove. The photoresist may remain from an earlier masking step, or may be freshly deposited for providing the widened upper end. Alternatively, gray-scale lithography and/or differential etching of mask material and/or coating material may be exploited to yield a widened upper end of the notch/groove, as described hereinabove.

Methods and apparatus disclosed herein may be employed for accurately establishing and stably maintaining relative positioning (and transverse-coupling) of transverse-coupled optical components. It has been discovered that transverse-coupled components may be embedded or encapsulated in a substantially transparent substantially solid low-index medium (preferably having a refractive index lower than either of the transverse-coupled components) without substantially disturbing the transverse-coupling, and in fact substantially enhancing the stability of the transverse coupling and substantially relaxing alignment tolerances for reliably and reproducibly achieving the same. The presence of a medium of a higher refractive index than air or inert gas may affect the modal index of optical modes supported by the transverse-coupled components and having evanescent portions. This effect must be accounted for in designing passive-modal-index-matched components or adiabatic-coupled components, or compensated for using active-modal-index-matched components. (Active and passive modal-index-matching are discussed in detail in earlier-cited applications A11, A12, and A14; the discussion need not be repeated here.) The embedding medium substantially prevents relative movement of the transverse-coupled components, thereby substantially eliminating variation in the efficiency of optical power transfer between the components. In addition, surfaces of the transverse-coupled optical components that would otherwise be exposed to contamination are protected, and variation/degradation of transverse-coupling due to contamination is substantially prevented. Embedding or encapsulating the transverse-coupled components therefore yields a nearly hermetic package therefor.

A suitable low-index embedding medium should preferably enable deposition thereof in a manner resulting in material of relatively high optical quality, with few if any bubbles, inclusions, or other defects that could induce optical loss. A suitable low-index medium may preferably have a refractive index lower than that of either of the transverse-coupled optical components. An example of a suitable material is CYTOP (Asahi Glass Company), a poly-fluorinated polymeric material that may be cross-linked. This polymer is chemically inert and upon polymerization (by heat curing) forms high-optical-quality material having a refractive index of about 1.34. Once an optical device (including transverse-coupled optical components, which may or may not include alignment members according to the present invention) has been fabricated/assembled, it may be spray-, spin-, or dip-coated with the monomer and heat cured. The manufacturer's published two-step heat curing procedure may be followed, in which the material is quickly heated to a first cure temperature, and subsequently quickly heated to a second, higher cure temperature. An alternative cure procedure may be employed utilizing similar cure temperatures but gradually ramping up to each cure temperature. Examples of other low-index materials that may be suitable for embedding transverse-coupled optical components may include: silicone and silicone-based materials, spin-on glass materials, siloxane polymers, Cyclotene™ (B-staged bis-benzocyclobutene, Dow), Teflon® AF (DuPont), acrylate polymers, epoxy polymers, other low-index polymers, silica and silica-based materials, and other low-index materials. Some of the polymeric materials are heat cured, and several may also melt at relatively low temperatures. This must be taken into account if subsequent fabrication/assembly/packaging steps may require high temperature processes (such as soldering, for example). Any optical device that includes transverse-coupled optical components may potentially benefit from encapsulation in a substantially transparent lower-index optical medium, including embodiments disclosed herein (including those preferably fabricated on a substantially planar substrate) and in the applications cited hereinabove (which may or may not include a substantially planar substrate and/or assembly geometry).

It should be emphasized that transverse-coupled optical devices may employ alignment members according to the present invention without being embedded or encapsulated. Transverse-coupled optical devices may be embedded or encapsulated according to the present invention without employing alignment members. Transverse-coupled optical devices may employ alignment members according to the present invention and also be embedded or encapsulated according to the present invention. In this case the alignment members serve to accurately position the transverse-coupled optical components and then may also serve to hold them in place during the encapsulation process. Various suitable combinations of alignment members/methods and/or embedding/encapsulation may fall within the scope of inventive concepts disclosed and/or claimed herein.

Figure 13:
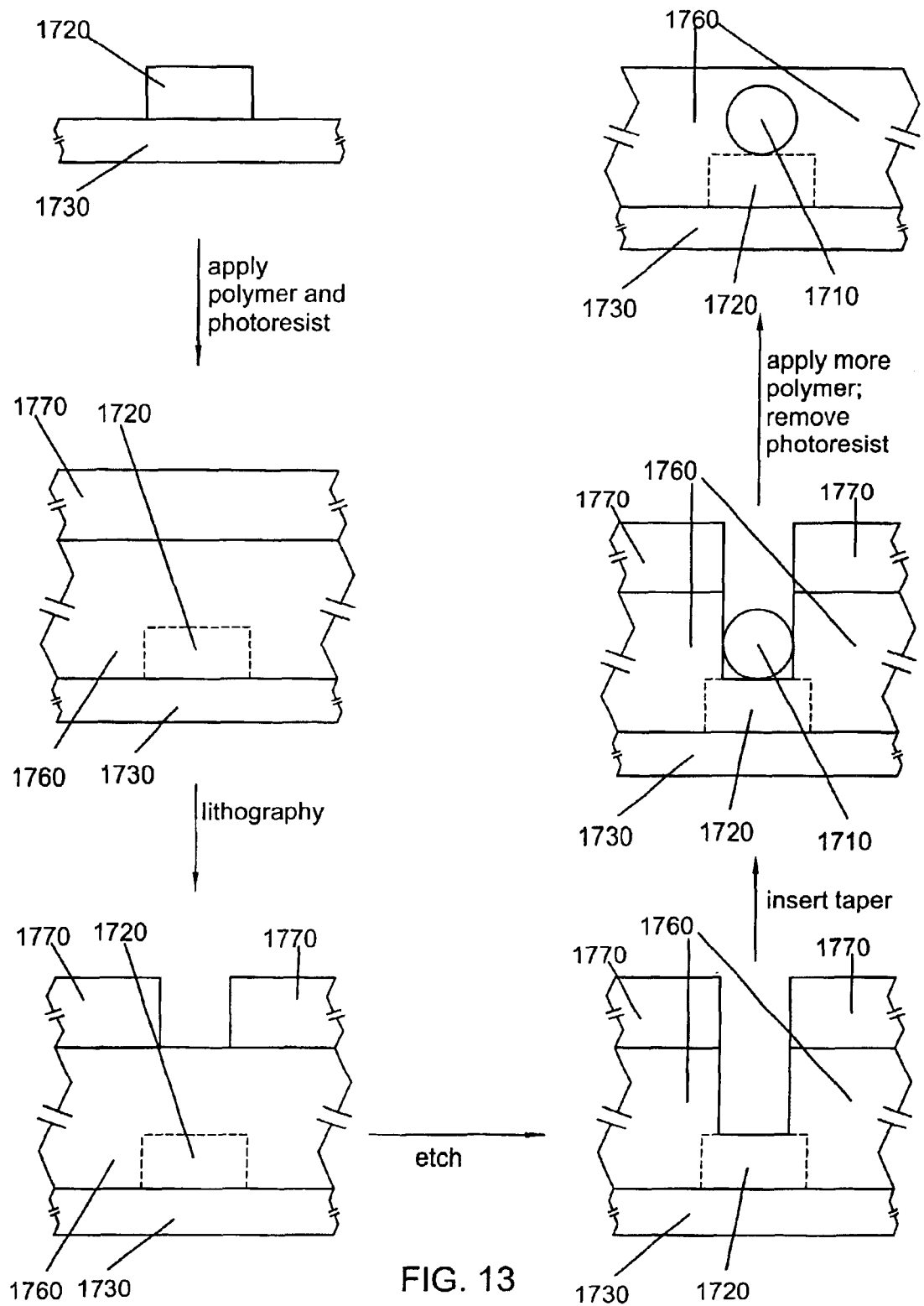
FIG. 13 is a process diagram illustrating transverse-coupling alignment apparatus and methods according to the present invention.

Alternative methods and embodiments of the present invention are illustrated in FIG. 13 that combine the use of alignment members and the use of encapsulation for optical devices that include one or more transverse-coupled optical components. An optical component 1720 is fabricated on a substrate 1730 using precision spatially-selective material processing techniques, and is then coated with a substantially transparent low-index medium 1760 of high optical quality (this coating step may include heat curing or irradiative curing). The polymer CYTOP may be employed, for example, although any suitable optical low-index medium may be employed (as described hereinabove). The low-index layer 1760 is then coated with an etch mask 1770 that is patterned to include a groove aligned along optical component 1720. Binary lithography is shown yielding substantially vertical lateral surfaces of the groove, but gray-scale lithography or binary lithography followed by heating may be alternatively employed to yield slanted lateral groove surfaces. The low-index layer 1760 is then etched to deepen the groove through layer 1760 above component 1720, thus forming an alignment member. The groove may preferably extend all the way down to the top surface of component 1720, or alternatively some predetermined thickness of material 1760 may be left as an optical spacer on top of component 1720. A fiber-optic taper 1710 (or other transverse-coupled component) is then placed within the groove above component 1720. The depth and horizontal position of the groove serve to accurately establish the relative position of taper 1710 and component 1720. Etch mask 1770 (e.g., photoresist layer) and/or low-index layer 1760 may be reflowed (or gray-scale lithography may be employed) to form a widened upper portion of the groove, thereby facilitating insertion of the fiber-optic taper 1710 into the groove, in a manner similar to that disclosed hereinabove.

Once taper 1710 is properly positioned relative to component 1720 within the groove, additional low-index medium may be deposited to fill the groove, encapsulating component 1720 and taper 1710 transverse-coupled thereto. This encapsulation step may include heat curing or irradiative curing of the additional low-index material. The remaining photoresist 1770 may be removed. The encapsulation of taper 1710 and component 1720 ensures that their relative positions will be stably maintained, and that surfaces of taper 1710 and component 1720 will not become contaminated. Variations in optical power transfer between taper 1710 and component 1720 are therefore substantially reduced.

The accuracy with which the groove may be positioned relative to optical device 1720 (both horizontal position and depth) determines the eventual accuracy with which taper 1710 and component 1720 may be relatively positioned. Precision material processing techniques may be employed to fabricate component 1720 on substrate 1730, and then to accurately position the groove relative to component 1720. As with the other methods disclosed herein, accurate alignment of components and/or alignment members is achieved on a wafer-scale (for many components and corresponding alignment members simultaneously) using precision spatially-selective material processing techniques well-suited for the purpose and at a fairly early stage of the overall device fabrication/assembly/packaging process. This substantially reduces or eliminates the need for active alignment of components at later stages of the process.

The present invention has been set forth in the forms of its preferred and alternative embodiments. It is nevertheless intended that modifications to the disclosed alignment apparatus and methods for transverse optical coupling may be made without departing from inventive concepts disclosed and/or claimed herein.

What is claimed is:

1. An optical apparatus, comprising:
a planar optical waveguide formed on a waveguide substrate;
a second optical waveguide transverse-coupled with the planar waveguide at respective transverse-coupling segments thereof; and
an alignment member formed on the waveguide substrate, the second waveguide in substantial mechanical engagement therewith, the alignment member positioned on the waveguide substrate relative to the planar waveguide so as to accurately establish and stably maintain relative transverse positioning and transverse optical coupling of the planar waveguide and the mechanically engaged second waveguide.

2. The apparatus of claim 1, the second waveguide comprising a fiber-optic taper.

3. The apparatus of claim 2, further comprising a second alignment member formed on the waveguide substrate, the fiber-optic taper in substantial mechanical engagement therewith, the second alignment member positioned on the waveguide substrate relative to the planar waveguide so as to accurately establish and stably maintain relative transverse positioning and transverse optical coupling of the planar waveguide and the mechanically engaged fiber-optic taper, the transverse-coupling segment of the fiber-optic taper being between the alignment members.

4. The apparatus of claim 1, the alignment member including two lateral protruding members and a central support member therebetween, the protruding members forming a notch therebetween, the mechanically engaged second waveguide being received at least partly within the notch.

5. The apparatus of claim 4, inner walls of the notch being substantially vertical relative the waveguide substrate.

6. The apparatus of claim 5, the protruding members being formed at least in part by binary lithography.

7. The apparatus of claim 4, inner walls of the notch being laterally sloped relative to the waveguide substrate, the notch thereby narrowing toward a bottom thereof.

8. The apparatus of claim 7, the protruding members being formed at least in part by gray-scale lithography.

9. The apparatus of claim 7, the protruding members being formed at least in part by reflow of material forming the protruding members.

10. The apparatus of claim 4, the central support member comprising material substantially similar to material of the planar waveguide.

11. The apparatus of claim 4, material of the protruding members differing from material of the central support member.

12. The apparatus of claim 11, the protruding members including photoresist material.

13. The apparatus of claim 11, the protruding members including glassy material.

14. The apparatus of claim 11, the protruding members including silica-based material.

15. The apparatus of claim 11, the protruding members including polymer material.

16. The apparatus of claim 4, lateral portions of the alignment member extending longitudinally beyond the central support member in contact with the waveguide substrate.

17. The apparatus of claim 1, the alignment member including two laterally displaced alignment base members and a substantially conformal material coating layer thereon, surfaces of the conformal coating forming a notch, the mechanically engaged second waveguide being received at least partly within the notch.

18. An apparatus, comprising:
   a plurality of planar optical waveguides formed on a waveguide substrate;
   a plurality of alignment members formed on the waveguide substrate, each of the plurality of alignment members being adapted for receiving a second optical waveguide in substantial mechanical engagement therewith, each of the plurality of alignment members being positioned on the waveguide substrate relative to a corresponding one of the plurality of planar waveguides so as to accurately establish and stably maintain relative transverse positioning and transverse optical coupling of the corresponding planar waveguide and the mechanically engaged second waveguide.

19. A method for aligning a planar optical waveguide and a second optical waveguide for transverse optical coupling therebetween, comprising:
   forming the planar waveguide on a waveguide substrate;
   forming an alignment member on the waveguide substrate; and
   assembling the second waveguide in substantial mechanical engagement with the alignment member, thereby establishing transverse optical coupling between the planar waveguide and the second waveguide at respective transverse-coupling segments thereof,
   the alignment member positioned on the waveguide substrate relative to the planar waveguide so as to accurately establish and stably maintain relative transverse positioning and transverse optical coupling of the planar waveguide and the mechanically engaged second waveguide.

20. The method of claim 19, the second waveguide comprising a fiber-optic taper.

21. The method of claim 20, further comprising forming a second alignment member on the waveguide substrate and assembling the fiber-optic taper in substantial mechanical engagement therewith, the second alignment member positioned on the waveguide substrate relative to the planar waveguide so as to accurately establish and stably maintain relative transverse positioning and transverse optical coupling of the planar waveguide and the mechanically engaged fiber-optic taper, the transverse-coupling segment of the fiber-optic taper being between the alignment members.

22. The method of claim 19, the alignment member including two lateral protruding members and a central support member therebetween, the protruding members forming a notch therebetween, the mechanically engaged second waveguide being received at least partly within the notch.

23. The method of claim 22, inner walls of the notch being substantially vertical relative the waveguide substrate.

24. The method of claim 23, forming the alignment member including forming the protruding members at least in part by binary lithography.

25. The method of claim 22, inner walls of the notch being laterally sloped relative to the waveguide substrate, the notch thereby narrowing toward a bottom thereof.

26. The method of claim 25, forming the alignment member including forming the protruding members at least in part by gray-scale lithography.

27. The method of claim 25, forming the alignment member including forming the protruding members at least in part by reflowing material forming the protruding members.

28. The method of claim 22, the central support member comprising material substantially similar to material of the planar waveguide.

29. The method of claim 22, material of the protruding members differing from material of the central support member.

30. The method of claim 29, the protruding members including photoresist material.

31. The method of claim 29, the protruding members including glassy material.

32. The method of claim 29, the protruding members including silica-based material.

33. The method of claim 29, the protruding members including polymer material.

34. The method of claim 22, lateral portions of the alignment member extending longitudinally beyond the central support member in contact with the waveguide substrate.

35. The method of claim 19, forming the alignment member including:
   forming two laterally displaced alignment base members on the waveguide substrate; and
   depositing a substantially conformal material coating layer on the alignment base members, surfaces of the conformal coating forming a notch, the mechanically engaged second waveguide being received at least partly within the notch.

36. A method for fabricating a plurality of planar optical waveguides for transverse optical coupling, comprising:
   forming the plurality of planar waveguides on a waveguide substrate;
   forming a plurality of alignment members formed on the waveguide substrate, each of the plurality of alignment members being adapted for receiving a second optical waveguide in substantial mechanical engagement therewith, each of the plurality of alignment members being positioned on the waveguide substrate relative to a corresponding one of the plurality of planar waveguides so as to accurately establish and stably maintain relative transverse positioning and transverse optical coupling of the corresponding planar waveguide and the mechanically engaged second waveguide.

37. The method of claim 36, further comprising:
   dividing the waveguide substrate into a plurality of substrate segments having thereon at least one of the plurality of planar waveguides and at least one corresponding alignment member; and for at least one of the substrate segments, assembling a second optical waveguide in substantial mechanical engagement with the alignment member on the substrate segment, thereby establishing transverse optical coupling between the planar waveguide thereon and the second waveguide at respective 9 transverse-coupling segments thereof.

38. An optical apparatus, comprising:
a planar optical waveguide formed on a waveguide substrate;
a second optical waveguide transverse-coupled with the planar waveguide at respective transverse-coupling segments thereof; and
a substantially solid substantially transparent low-index medium substantially embedding transverse-coupling portions of the planar waveguide and second waveguide.

39. The apparatus of claim 38, the second waveguide comprising a fiber-optic taper.

40. The apparatus of claim 38, further comprising an alignment member formed on the waveguide substrate, the second waveguide in substantial mechanical engagement therewith, the alignment member positioned on the waveguide substrate relative to the planar waveguide so as to accurately establish relative transverse positioning and transverse optical coupling of the planar waveguide and the mechanically engaged second waveguide.

41. A method for aligning a planar optical waveguide and a second optical waveguide for transverse optical coupling therebetween, comprising:
forming the planar waveguide on a waveguide substrate;
assembling the second waveguide so as to establish transverse optical coupling therebetween at respective transverse-coupling segments thereof; and
substantially embedding transverse-coupling segments of the planar waveguide and second waveguide within a substantially solid substantially transparent low-index medium.

42. The method of claim 41, the second waveguide comprising a fiber-optic taper.

43. The method of claim 41, further comprising:
forming an alignment member on the waveguide substrate, the alignment member positioned on the waveguide substrate relative to the planar waveguide so as to accurately establish relative transverse positioning and transverse optical coupling of the planar waveguide and the mechanically engaged second waveguide; and
assembling the second waveguide in substantial mechanical engagement with the alignment member, thereby establishing transverse optical coupling between the planar waveguide and the second waveguide at respective transverse-coupling segments thereof.

44. The method of claim 41,
the second waveguide comprising a fiber-optic taper,
further comprising forming a second alignment member on the waveguide substrate and assembling the fiber-optic taper in substantial mechanical engagement therewith, the second alignment member positioned on the waveguide substrate relative to the planar waveguide so as to accurately establish and stably maintain relative transverse positioning and transverse optical coupling of the planar waveguide and the mechanically engaged fiber-optic taper, the transverse-coupling segment of the fiber-optic taper being between the alignment members.

45. The method of claim 41, the embedding including:
substantially embedding the transverse-coupling segment of the planar waveguide within the low-index medium;
forming an alignment structure within the low-index medium adapted for substantial mechanical engagement with the second waveguide, the alignment structure positioned relative to the planar waveguide so as to accurately establish relative transverse positioning and transverse optical coupling of the planar waveguide and the mechanically-engaged second waveguide;
substantially mechanically engaging the second waveguide and the alignment structure, thereby establishing transverse optical coupling between the planar waveguide and the second waveguide at respective transverse-coupling segments thereof; and
substantially embedding the transverse-coupling segment of the second waveguide within the low-index medium.

46. The method of claim 45, the alignment structure including a groove in the low-index medium.

47. The method of claim 41, the low-index medium including glassy material.

48. The method of claim 41, the low-index medium including silica-based material.

49. The method of claim 41, the low-index medium including polymer material.

50. A method for fabricating a plurality of planar optical waveguides for transverse optical coupling, comprising:
forming the plurality of planar waveguides on a waveguide substrate;
substantially embedding the plurality of planar waveguides within a substantially solid substantially transparent low-index medium;
forming a plurality of alignment structures within the low-index medium, each of the plurality of alignment structures being adapted for receiving a second optical waveguide in substantial mechanical engagement therewith, each of the plurality of alignment structures being positioned relative to a corresponding one of the plurality of planar waveguides so as to accurately establish relative transverse positioning and transverse optical coupling of the corresponding planar waveguide and the mechanically-engaged second waveguide.

51. The method of claim 50, further comprising:
dividing the waveguide substrate into a plurality of substrate segments having thereon at least one of the plurality of planar waveguides and at least one corresponding alignment structure;
for at least one of the substrate segments, assembling a second optical waveguide in substantial mechanical engagement with the alignment structure on the substrate segment, thereby establishing transverse optical coupling between the planar waveguide thereon and the second waveguide at respective transverse-coupling segments thereof; and
substantially embedding the transverse-coupling segment of the second waveguide within the low-index medium.

52. The method of claim 50, each of the plurality of alignment structures including a groove in the low-index medium.

53. An optical apparatus,
a plurality of planar optical waveguides formed on a waveguide substrate;
a substantially solid substantially transparent low-index medium substantially embedding the plurality of planar waveguides; and a plurality of alignment structures formed within the low-index medium, each of the plurality of alignment structures being adapted for receiving a second optical waveguide in substantial mechanical engagement therewith, each of the plurality of alignment structures being positioned relative to a corresponding one of the plurality of planar waveguides so as to accurately establish relative transverse positioning and transverse optical coupling of the corresponding planar waveguide and the mechanically engaged second waveguide.

54. The apparatus of claim 53, each of the plurality of alignment structures including a groove in the low-index medium.

* * * * *

UNITED STATES PATENT AND TRADEMARK OFFICE
CERTIFICATE OF CORRECTION

PATENT NO. : 6,870,992 B2 Page 1 of 1
APPLICATION NO. : 10/302751
DATED : March 22, 2005
INVENTOR(S) : Grosjean et al.

It is certified that error appears in the above-identified patent and that said Letters Patent is hereby corrected as shown below:

On the Title Page

(56) References Cited   Insert --2002/0037132  3/2002 Sercel et al.--
U.S. Patent Documents Signed and Sealed this Twenty-second Day of August, 2006

JON W. DUDAS
*Director of the United States Patent and Trademark Office*